United States Patent
Kim et al.

(10) Patent No.: US 12,101,668 B2
(45) Date of Patent: Sep. 24, 2024

(54) METHOD AND DEVICE FOR PERFORMING LOW LATENCY COMMUNICATION IN WIRELESS LAN SYSTEM

(71) Applicant: LG ELECTRONICS INC., Seoul (KR)

(72) Inventors: Suhwook Kim, Seoul (KR); Jeongki Kim, Seoul (KR); Jinsoo Choi, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 454 days.

(21) Appl. No.: 17/437,574

(22) PCT Filed: Mar. 25, 2020

(86) PCT No.: PCT/KR2020/004059
§ 371 (c)(1),
(2) Date: Sep. 9, 2021

(87) PCT Pub. No.: WO2020/197260
PCT Pub. Date: Oct. 1, 2020

(65) Prior Publication Data
US 2022/0150761 A1    May 12, 2022

Related U.S. Application Data

(60) Provisional application No. 62/823,673, filed on Mar. 26, 2019.

(30) Foreign Application Priority Data

Mar. 25, 2019 (KR) ........................ 10-2019-0033894
Oct. 11, 2019 (KR) ........................ 10-2019-0126459
Nov. 28, 2019 (KR) ........................ 10-2019-0156045

(51) Int. Cl.
*H04W 28/18* (2009.01)
*H04L 1/00* (2006.01)
(Continued)

(52) U.S. Cl.
CPC ........... *H04W 28/18* (2013.01); *H04L 1/0003* (2013.01); *H04W 72/54* (2023.01); *H04L 5/1438* (2013.01);
(Continued)

(58) Field of Classification Search
CPC ...... H04W 28/16; H04W 28/18; H04W 28/20
See application file for complete search history.

(56) References Cited

U.S. PATENT DOCUMENTS

2002/0065063 A1* 5/2002 Uhlik .................... H04W 72/56
455/404.1
2002/0097694 A1* 7/2002 Struhsaker ............. H04B 7/022
370/444

(Continued)

OTHER PUBLICATIONS

Li, Guoqing et al., CR for TSPEC, Apple, IEEE 802.11-18/1830rl, Nov. 8, 2018, see pp. 1-4.
(Continued)

*Primary Examiner* — Warner Wong
(74) *Attorney, Agent, or Firm* — BRYAN CAVE LEIGHTON PAISNER LLP

(57) ABSTRACT

An example according to the present specification relates to a method for performing low latency communication. A transmission STA and a reception STA may exchange a low latency communication request frame and a low latency communication response frame. The low latency communication request frame may include first information for performing the low latency communication. The first information may include at least one among information for requesting parameters for the low latency communication and information about traffic. In addition, the low latency communication response frame may include second information for performing the low latency communication. The second information may include information about the parameters for the low latency communication. The recep- (Continued)

tion STA and the transmission STA may perform the low latency communication with the transmission STA on the basis of the first information and the second information.

10 Claims, 31 Drawing Sheets

(51) Int. Cl.
  *H04W 72/54* (2023.01)
  *H04L 5/14* (2006.01)
  *H04W 28/02* (2009.01)
  *H04W 84/12* (2009.01)

(52) U.S. Cl.
  CPC ........ *H04W 28/0268* (2013.01); *H04W 84/12* (2013.01)

(56) References Cited

U.S. PATENT DOCUMENTS

| | | | | |
|---|---|---|---|---|
| 2002/0098858 | A1* | 7/2002 | Struhsaker | H04W 4/90 455/521 |
| 2005/0096008 | A1* | 5/2005 | Shin | H04M 1/665 455/404.1 |
| 2007/0064643 | A1* | 3/2007 | Tavares | H04W 48/18 370/333 |
| 2008/0090547 | A1* | 4/2008 | Struhsaker | H04W 76/50 455/404.1 |
| 2009/0252135 | A1 | 10/2009 | Benveniste | |
| 2018/0070237 | A1* | 3/2018 | Cho | H04W 12/033 |
| 2019/0021082 | A1* | 1/2019 | Sun | H04W 72/04 |
| 2019/0182639 | A1* | 6/2019 | Basu Mallick | H04W 72/23 |
| 2019/0239097 | A1* | 8/2019 | Meylan | H04W 24/02 |
| 2019/0297670 | A1* | 9/2019 | Shoji | H04L 45/72 |
| 2019/0363964 | A1* | 11/2019 | Gilson | H04L 45/306 |
| 2021/0289572 | A1* | 9/2021 | Deng | H04W 76/14 |

OTHER PUBLICATIONS

Lan, Zhou et al., Comment resolution on CID 20175, Broadcom Inc., IEEE 802.11-19/0427r1, Mar. 14, 2019, see slides 1-9.
Cavalcanti, Dave et al., Controlling latency in 802.11, Intel. IEEE 802.11-18/1160r0, Jul. 9, 2018, see slides 1-14.
Cariou, Laurent, CR for MU EDCA parameters, IEEE 802.11-19/0413r0, Mar. 13, 2019, see pp. 1-15.

* cited by examiner (a)

(b)

PPDU Format (IEEE 802.11a/g)

HT PPDU Format (IEEE 802.11n)

VHT PPDU Format (IEEE 802.11ac)

| Multi-band support (2110) | Low latency support (2120) | 16 Stream support (2130) | 320 MHz support (2140) |

| Element ID | Length (55) | TS Info | Nominal MSDU Size | Maximum MSDU Size | Minimum Service Interval | Maximum Service Interval | Inactivity Interval | Suspension Interval |
|---|---|---|---|---|---|---|---|---|
| 1 | 1 | 3 | 2 | 2 | 4 | 4 | 4 | 4 |

Octets :

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|
| 4 | 4 | 4 | 4 | 4 | 4 | 4 | 2 | 2 | 0 or 2 |

Octets :

METHOD AND DEVICE FOR PERFORMING LOW LATENCY COMMUNICATION IN WIRELESS LAN SYSTEM

This application is the National Stage filing under 35 U.S.C. 371 of International Application No. PCT/KR2020/004059 filed on Mar. 25, 2020, which claims priority to U.S. Provisional Application No. 62/823,673 filed on Mar. 26, 2019, which claims priority to Korean Patent Application Nos. 10-2019-0033894 filed on Mar. 25, 2019; 10-2019-0126459 filed on Oct. 11, 2019 and 10-2019-0156045 filed on Nov. 28, 2019, the contents of which are all hereby incorporated by reference herein in their entirety.

BACKGROUND OF THE DISCLOSURE

Field of the Disclosure

The present specification relates to a technique for transmitting and receiving data in wireless communication, and more particularly, to a method and a device for performing a low-latency communication in a wireless LAN system.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

With the recent surge in wired/wireless traffic, time delay-sensitive traffic has also increased significantly. Most of the time delay-sensitive traffic is often used to transmit real-time audio/video. Accordingly, with the proliferation of multimedia devices, the need to support time delay-sensitive traffic in a wireless environment has increased. However, since the transmission speed of wireless welcome is low compared to the transmission speed of a wired environment, and interference from the surroundings also occurs, various methods are required to support time delay-sensitive traffic.

In particular, a wireless LAN is a communication system that competes equally in an Industrial Scientific and Medical (ISM) band without a channel monopoly by a central base station. Accordingly, it is relatively more difficult for a wireless LAN to support time delay-sensitive traffic, compared to other communications than a wireless LAN. Accordingly, in the present specification, a technique for supporting traffic sensitive to time delay may be proposed.

SUMMARY

A method performed in a receiving station (STA) of a wireless local area network (WLAN) system according to various embodiments is configured for: transmitting a low-latency communication request frame, wherein the low-latency communication request frame includes first information for performing a low-latency communication, and the first information includes at least one of information for requesting a parameter for the low-latency communication and information related to a traffic; receiving a low-latency communication response frame, wherein the low-latency communication response frame includes second information for performing the low-latency communication, and the second information includes information related to the parameter for the low-latency communication; and based on the first information and the second information, performing the low-latency communication with a transmitting STA.

According to an embodiment of the present specification, a method for supporting traffic which is sensitive to time delay may be proposed. Specifically, the transmitting STA and the receiving STA may transmit and receive a signal for performing the low-latency communication, and may transmit/receive the traffic which is sensitive to the time delay through the low-latency communication. The transmitting STA and the receiving STA may exchange parameters for the low-latency communication. The transmitting STA and the receiving STA may perform the low-latency communication based on the parameters for the low-latency communication. Accordingly, according to an embodiment of the present specification, the latency may be reduced by changing a parameter based on traffic which is sensitive to the time delay. According to the embodiment of the present specification, the transmitting STA and the receiving STA report the current normal situation regarding the low-latency communication, and can efficiently perform the low-latency communication.

BRIEF DESCRIPTION OF THE DRAWINGS

FIG. 18 illustrates an example of a PPDU used in the present specification.

FIG. 21 shows an example of EHT Capability information element field configuration.

FIG. 22 shows an example of the TSPEC element field configuration.

DESCRIPTION OF EXEMPLARY EMBODIMENTS

Figure 1:
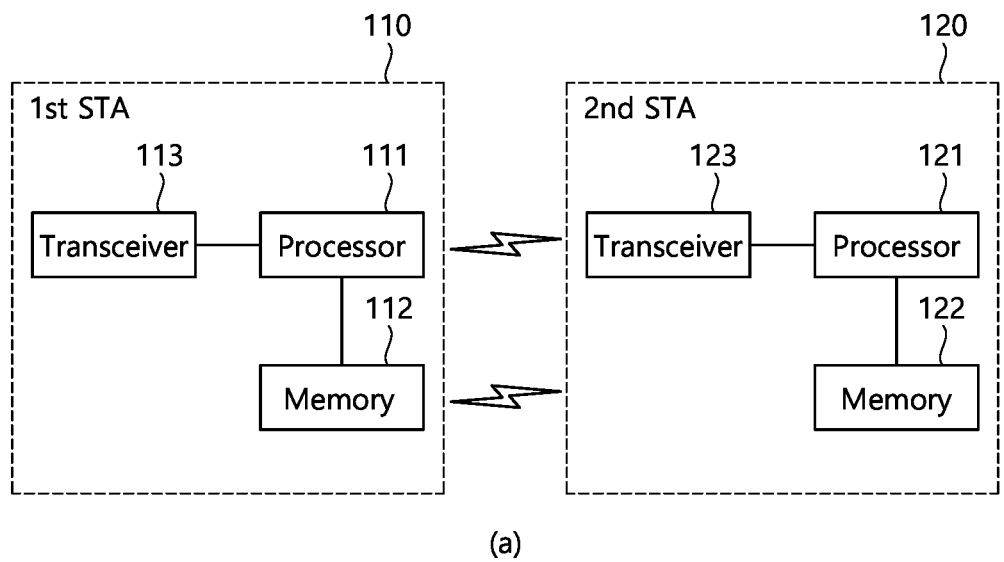
FIG. 1 shows an example of a transmitting apparatus and/or receiving apparatus of the present specification.
Figure 1:
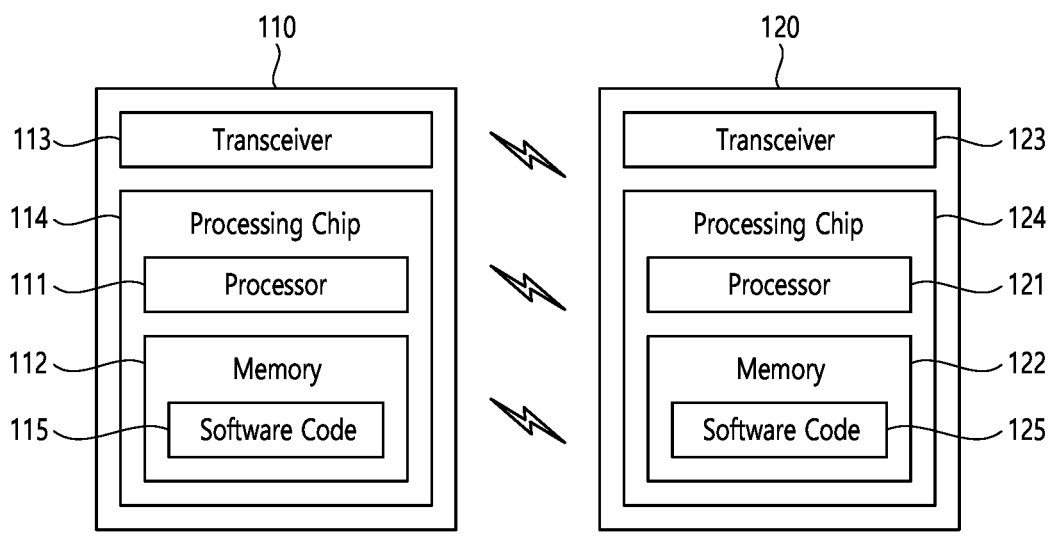

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
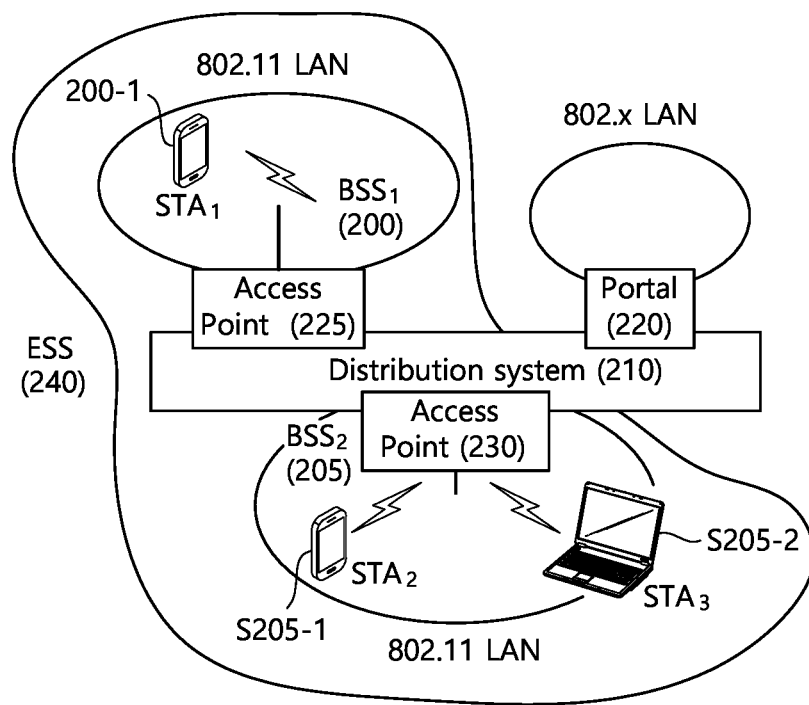
FIG. 2 is a conceptual view illustrating the structure of a wireless local area network (WLAN).
Figure 2:
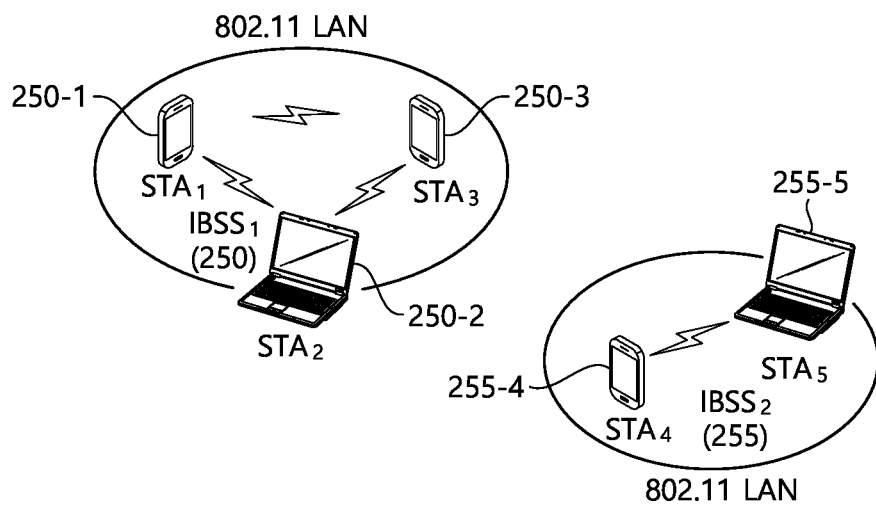

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e.EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e.EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
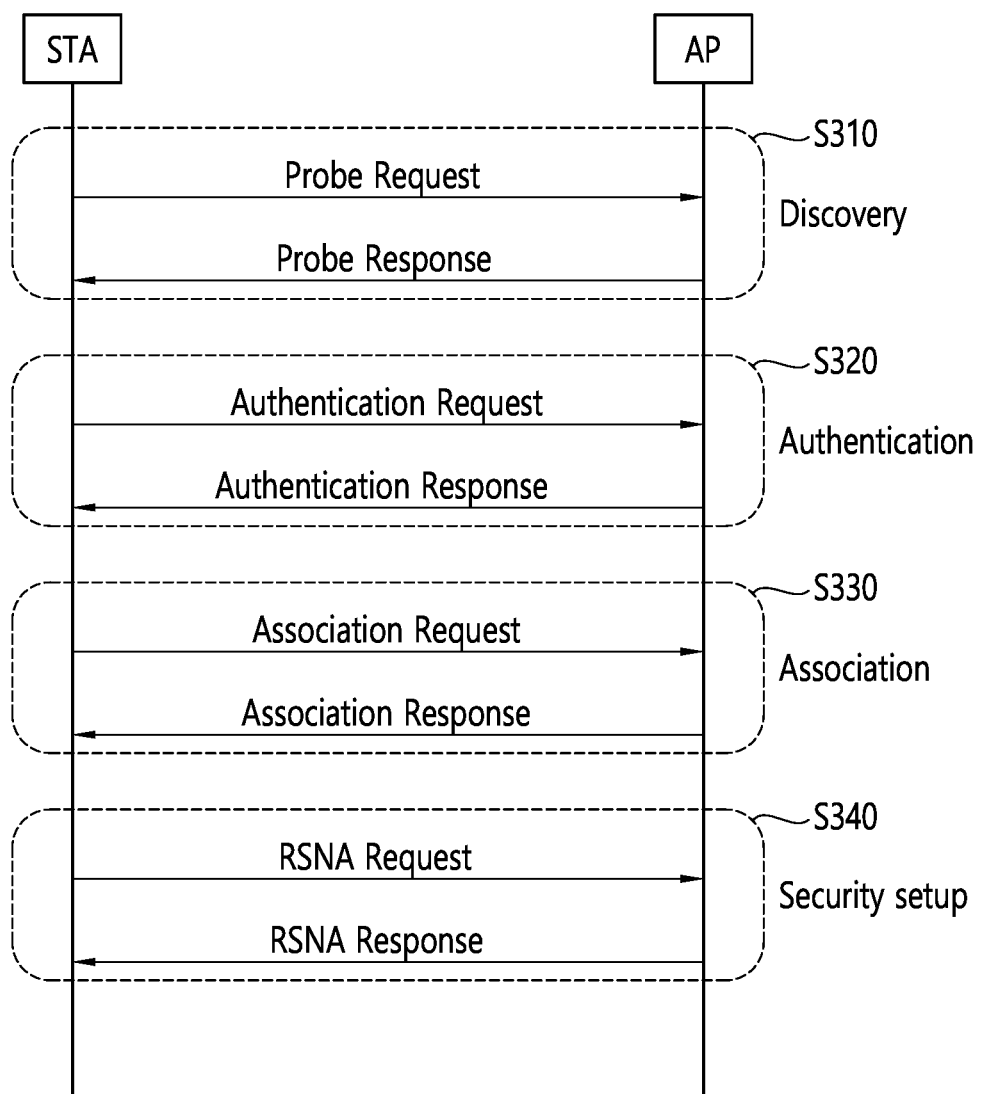
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
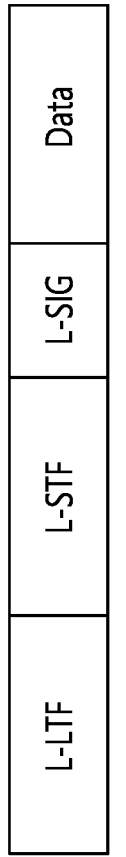
FIG. 4 illustrates an example of a PPDU used in an IEEE standard.
Figure 4:
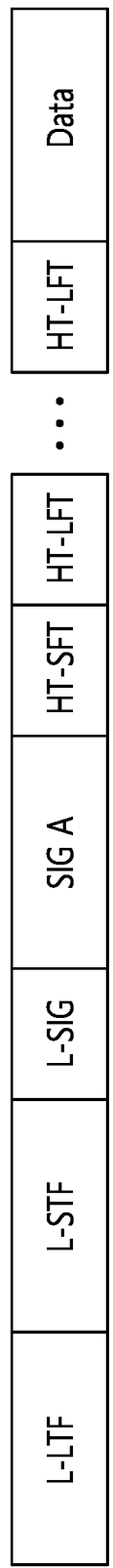
Figure 4:
Figure 4:
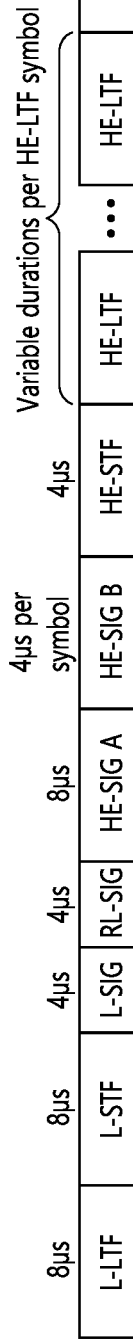

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
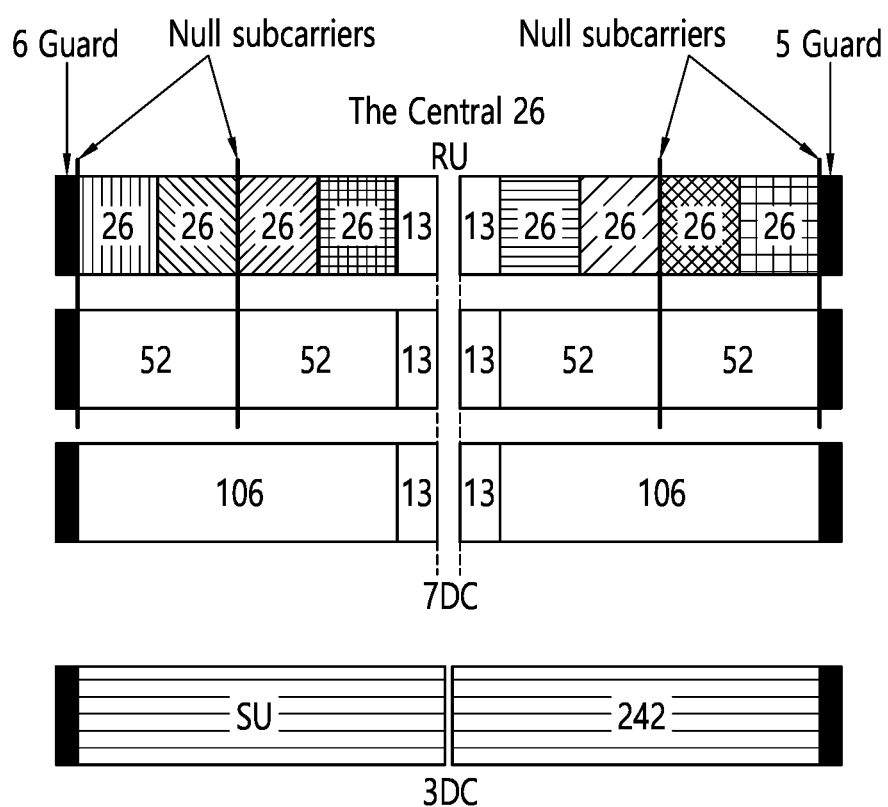
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
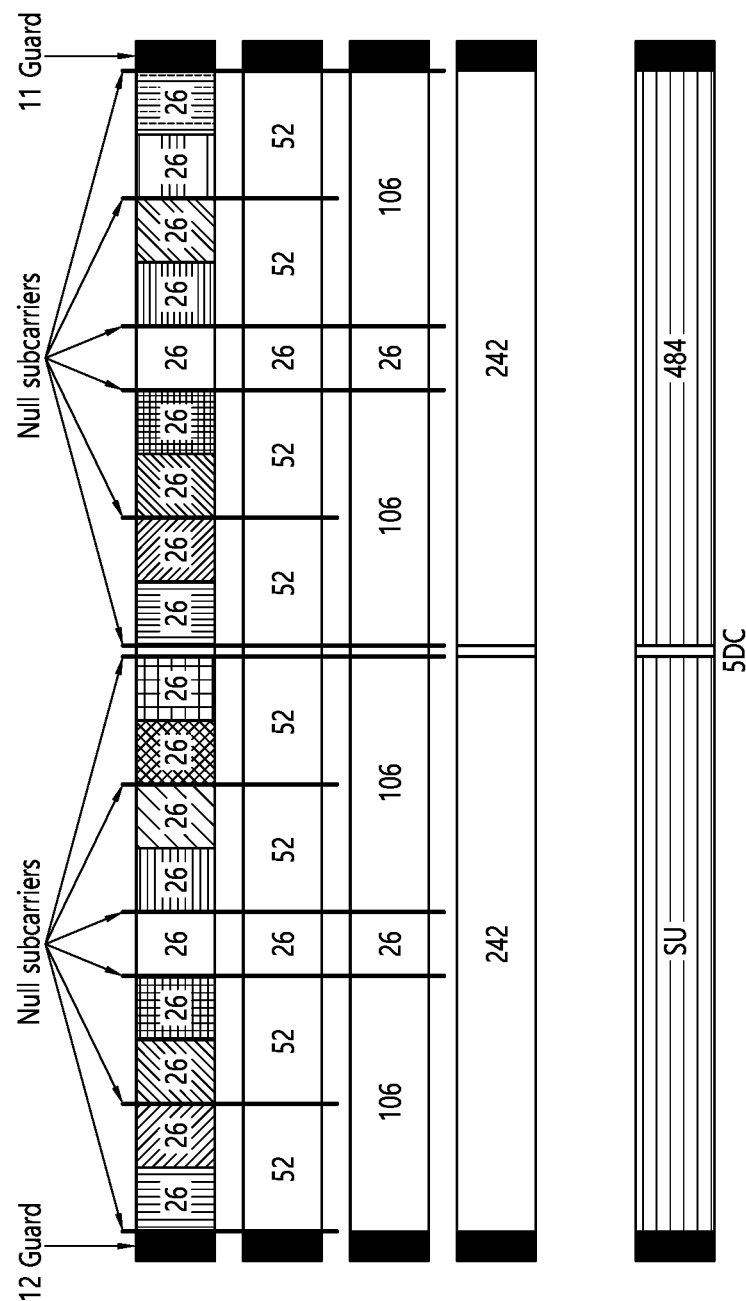
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484—RU may be used. The specific number of RUs may be changed similarly to FIG. 5.

Figure 7:
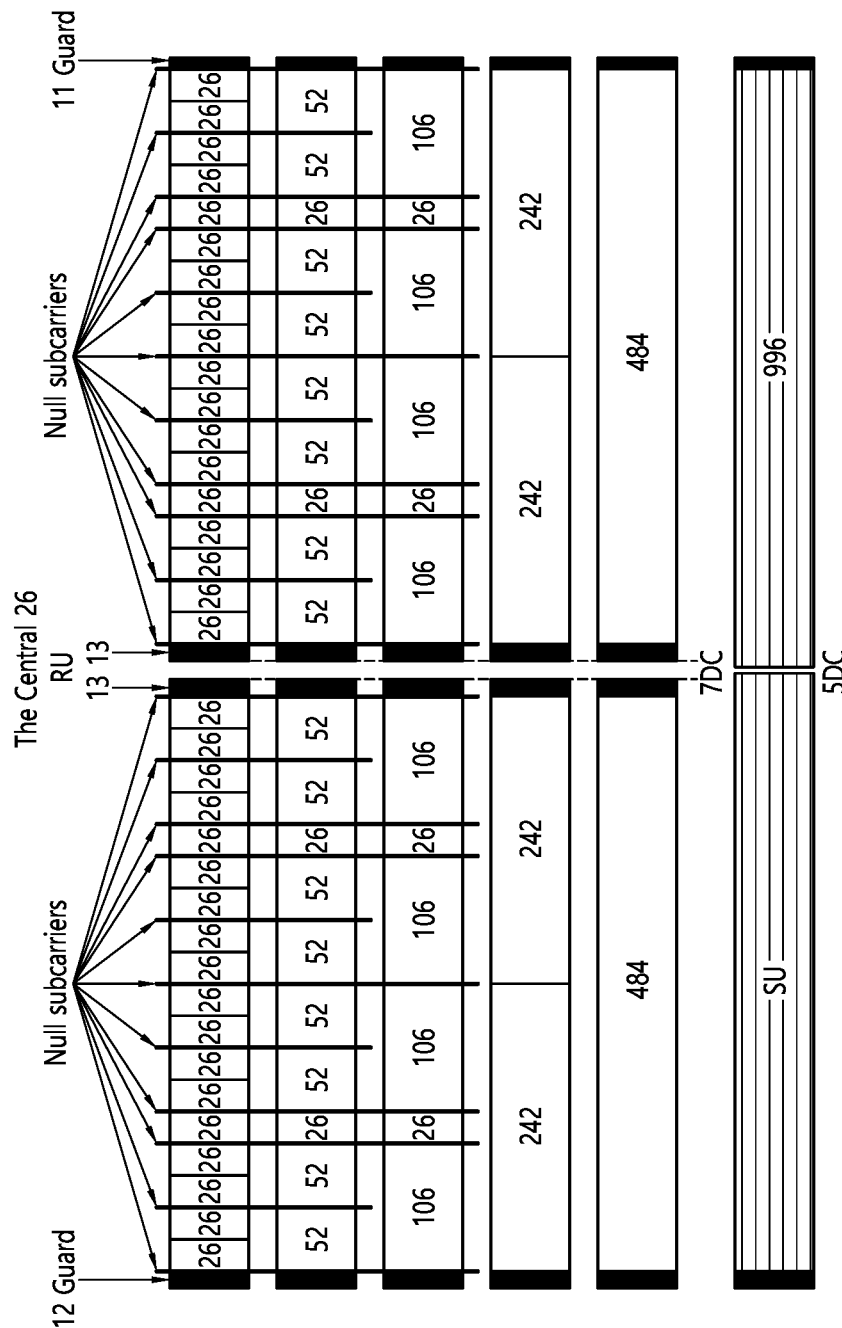
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
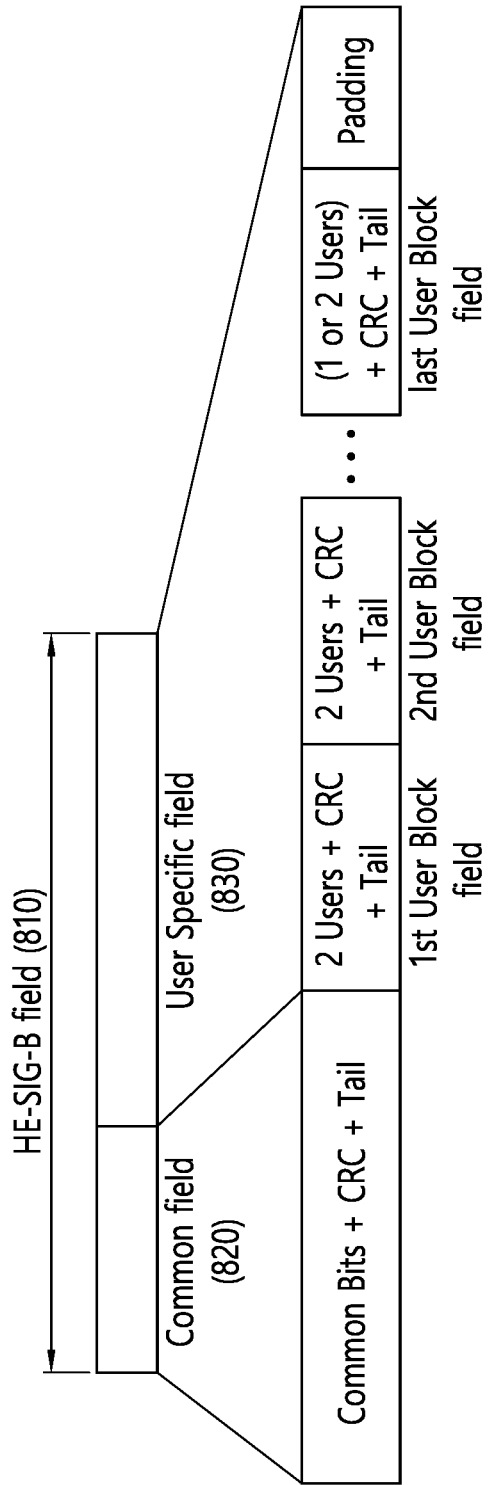
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | | 106 | | 26 | 26 | 26 | 26 | 26 | 8 |
| 01001$y_2y_1y_0$ | | | 106 | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
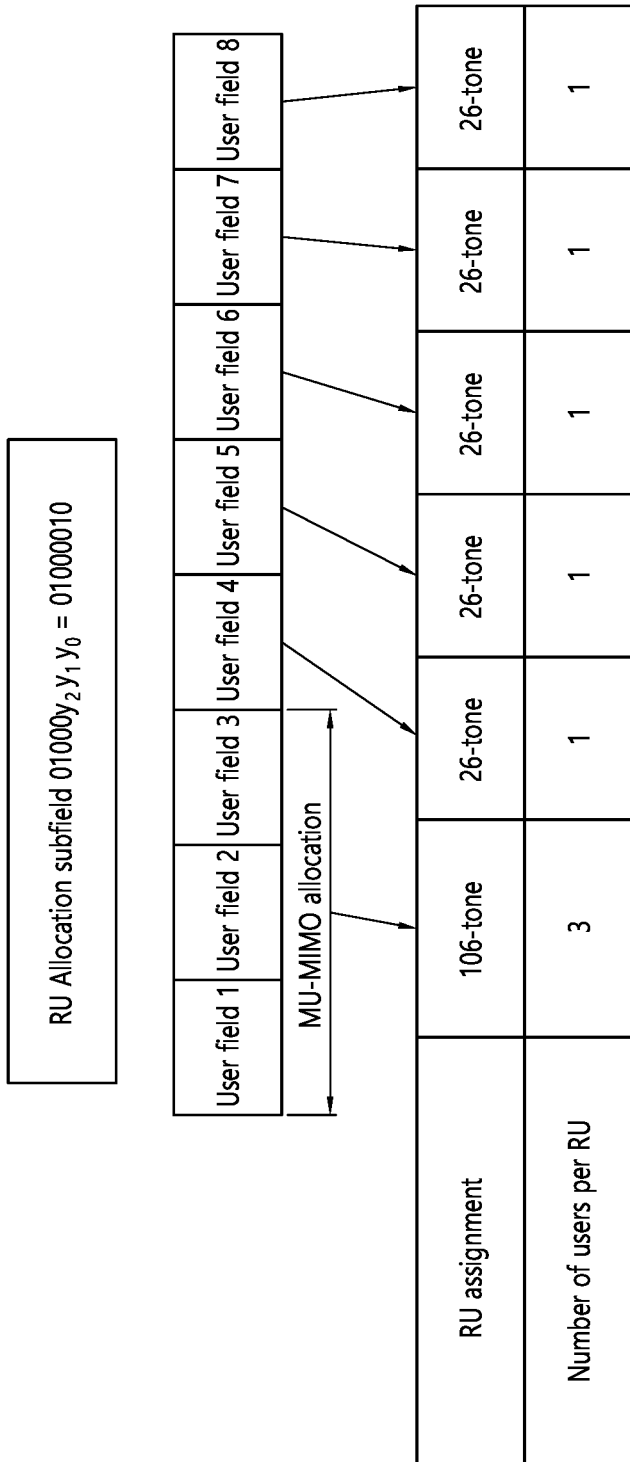
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 |    |
|   | 0111-1000 | 3-4 | 3 | | | | | | | 6-7 |    |
|   | 1001      | 4   | 4 | | | | | | | 8   |    |
| 3 | 0000-0011 | 1-4 | 1 | 1 | | | | | | 3-6 | 13 |
|   | 0100-0110 | 2-4 | 2 | 1 | | | | | | 5-7 |    |
|   | 0111-1000 | 3-4 | 3 | 1 | | | | | | 7-8 |    |
|   | 1001-1011 | 2-4 | 2 | 2 | | | | | | 6-8 |    |
|   | 1100      | 3   | 3 | 2 | | | | | | 8   |    |
| 4 | 0000-0011 | 1-4 | 1 | 1 | 1 | | | | | 4-7 | 11 |
|   | 0100-0110 | 2-4 | 2 | 1 | 1 | | | | | 6-8 |    |
|   | 0111      | 3   | 3 | 1 | 1 | | | | | 8   |    |
|   | 1000-1001 | 2-3 | 2 | 2 | 1 | | | | | 7-8 |    |
|   | 1010      | 2   | 2 | 2 | 2 | | | | | 8   |    |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 |   |
|   | 0110      | 2   | 2 | 2 | 1 | 1 | | | | 8   |   |
| 6 | 0000-0010 | 1-3 | 1 | 1 | 1 | 1 | 1 | | | 6-8 | 4 |
|   | 0011      | 2   | 2 | 1 | 1 | 1 | 1 | | | 8   |   |
| 7 | 0000-0001 | 1-2 | 1 | 1 | 1 | 1 | 1 | 1 | | 7-8 | 2 |
| 8 | 0000      | 1   | 1 | 1 | 1 | 1 | 1 | 1 | 1 | 8   | 1 |

A shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS

[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
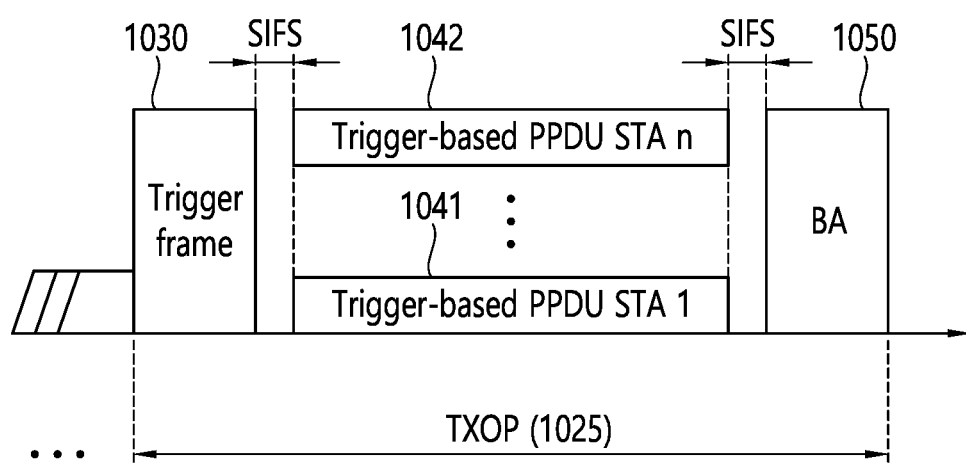
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
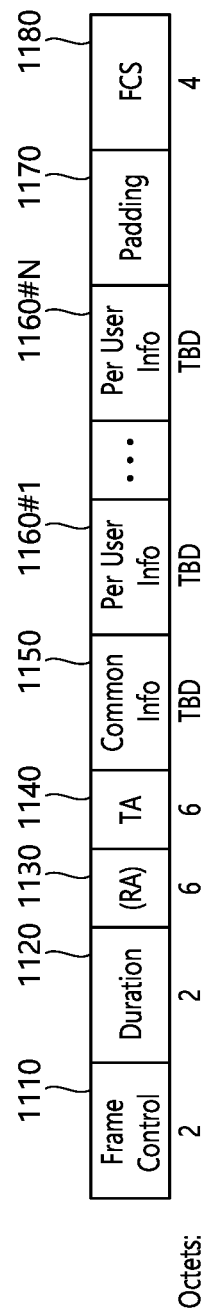
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
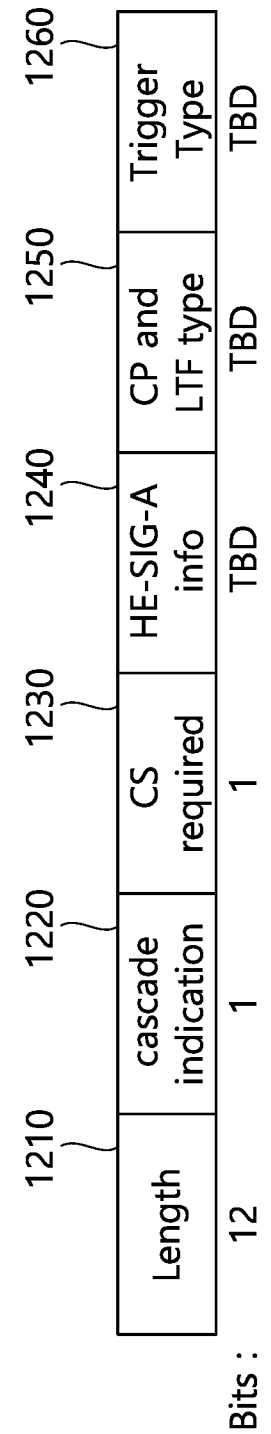
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
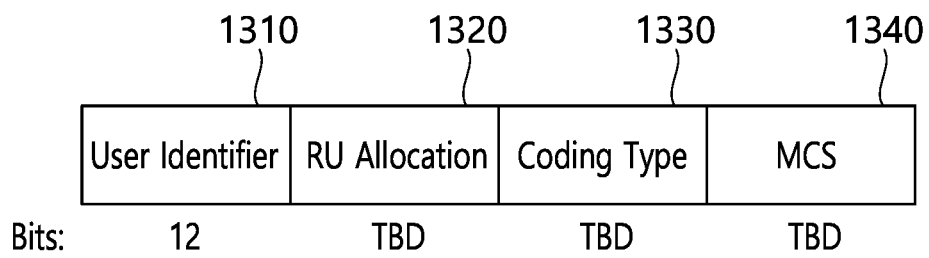
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
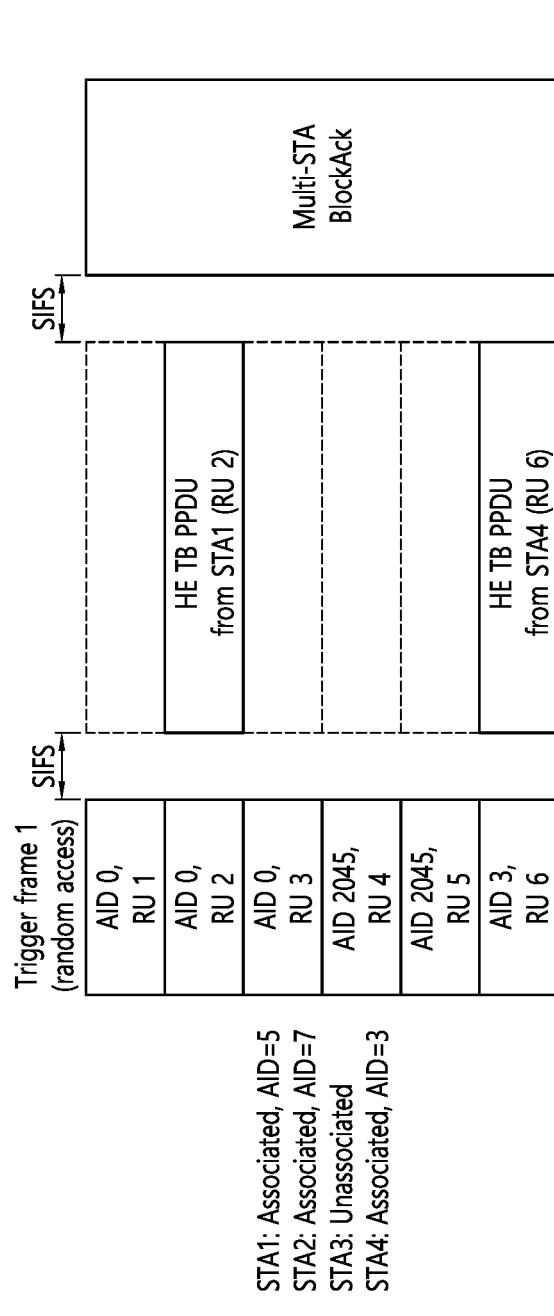
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
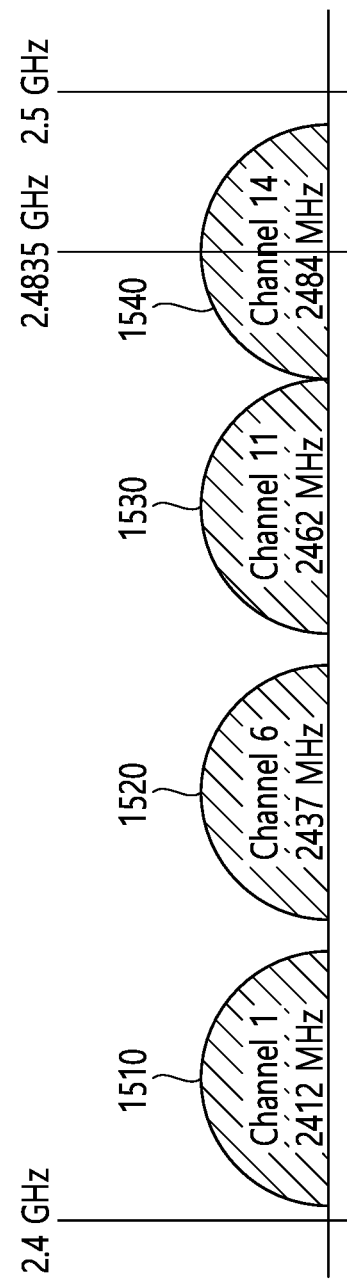
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
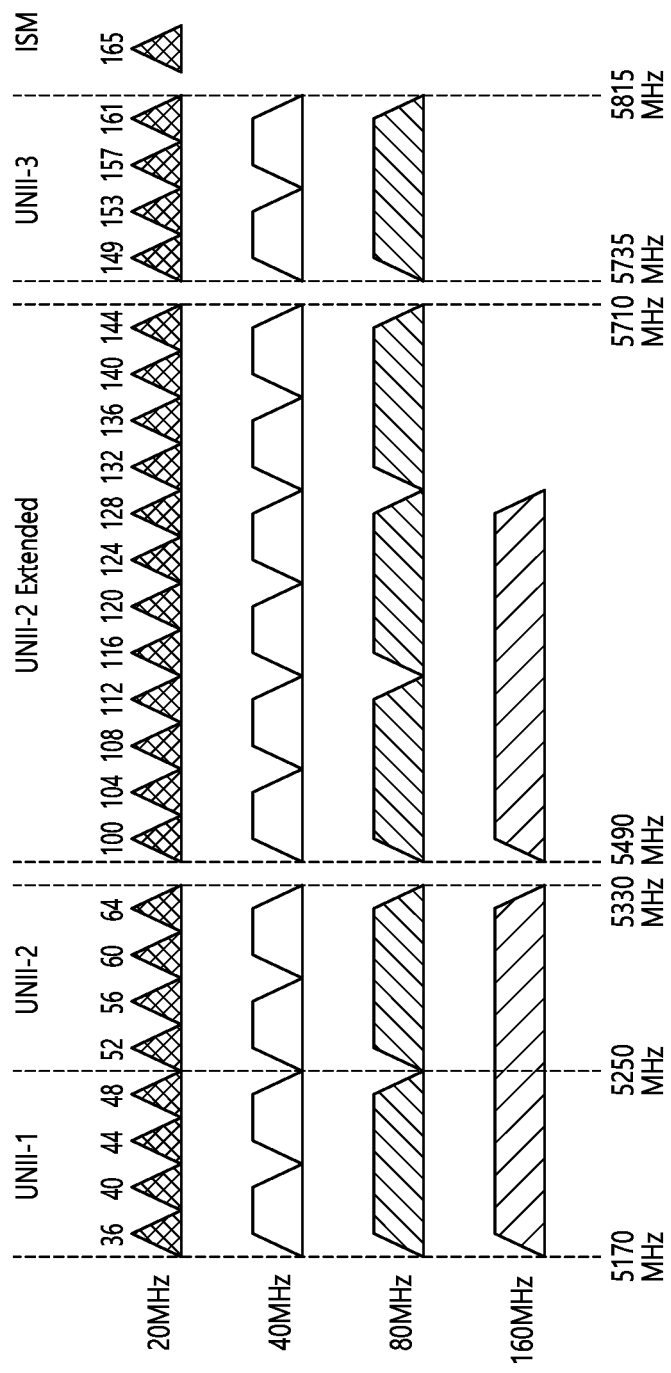
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
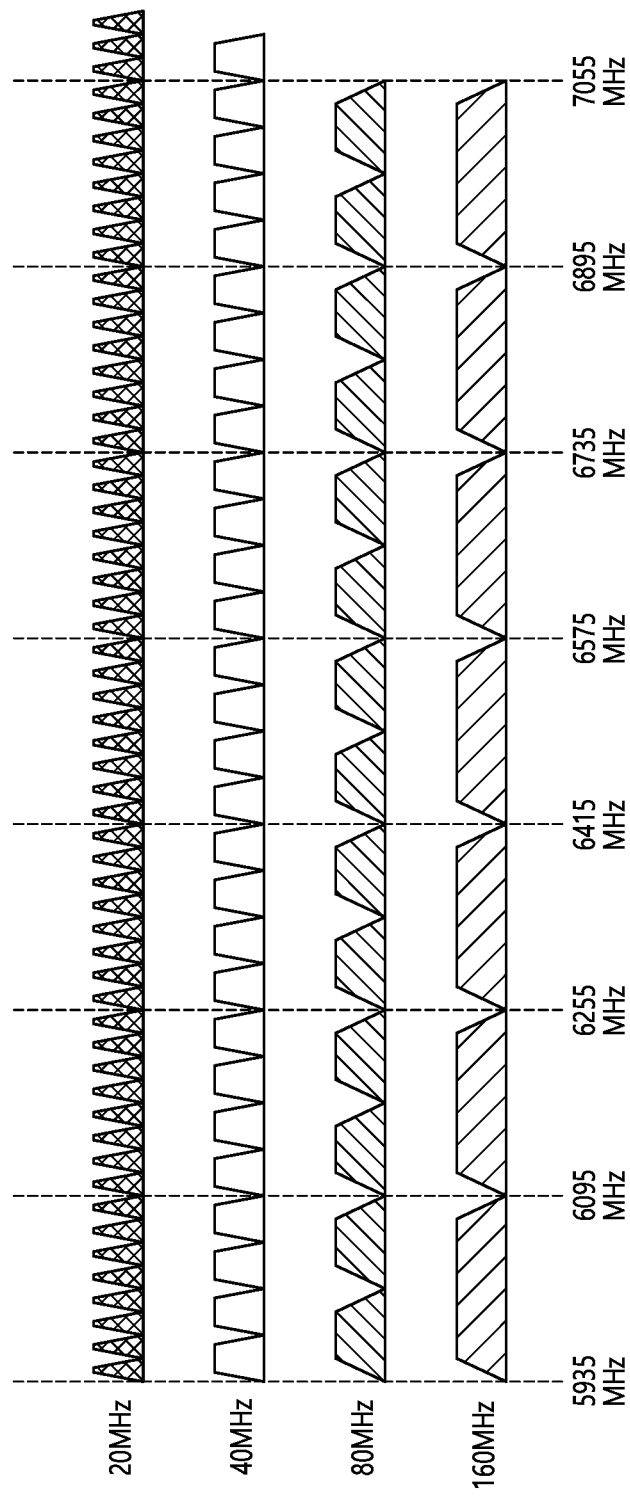
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
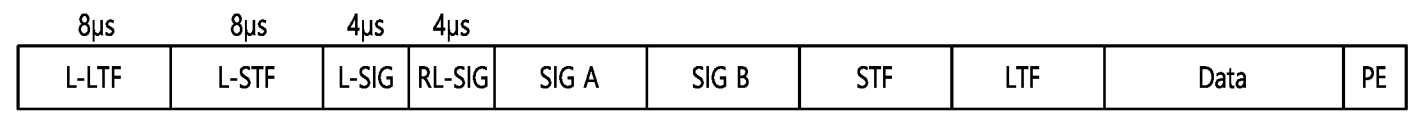

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, an STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After RL-SIG of FIG. 18, for example, an EHT-SIG-A or one control symbol may be inserted. A symbol located after the RL-SIG (i.e., the EHT-SIG-A or one control symbol in the present specification) may be referred as various names, such as a U-SIG (Universal SIG) field.

A symbol consecutive to the RL-SIG (e.g., U-SIG) may include information of N bits, and may include information for identifying the type of the EHT PPDU. For example, the U-SIG may be configured based on two symbols (e.g., two consecutive OFDM symbols). Each symbol (e.g., OFDM symbol) for U-SIG may have a duration of 4 us. Each symbol of the U-SIG may be used to transmit 26-bit information. For example, each symbol of the U-SIG may be transmitted/received based on 52 data tones and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of $R=\frac{1}{2}$ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is classified into various types (e.g., EHT PPDU supporting SU, EHT PPDU supporting MU, EHT PPDU related to Trigger Frame, EHT PPDU related to Extended Range transmission, etc.), information related to the type of the EHT PPDU may be included in version-independent bits or version-dependent bits of the U-SIG.

For example, the U-SIG field includes 1) a bandwidth field including information related to a bandwidth, 2) a field including information related an MCS scheme applied to the SIG-B, 3) a dual subcarrier modulation in the SIG-B (i.e., an indication field including information related to whether the dual subcarrier modulation) is applied, 4) a field including information related to the number of symbols used for the SIG-B, 5) a field including information on whether the SIG-B is generated over the entire band, 6) a field including information related to a type of the LTF/STF, and/or 7) information related to a field indicating a length of the LTF and the CP.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 µs, and a periodicity signal of 3.2 µs may be repeated 5 times to become a second type STF having a length of 16 µs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 µs. In addition, Guard Intervals (GIs) with various lengths (e.g., 0.8/1/6/3.2 µs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
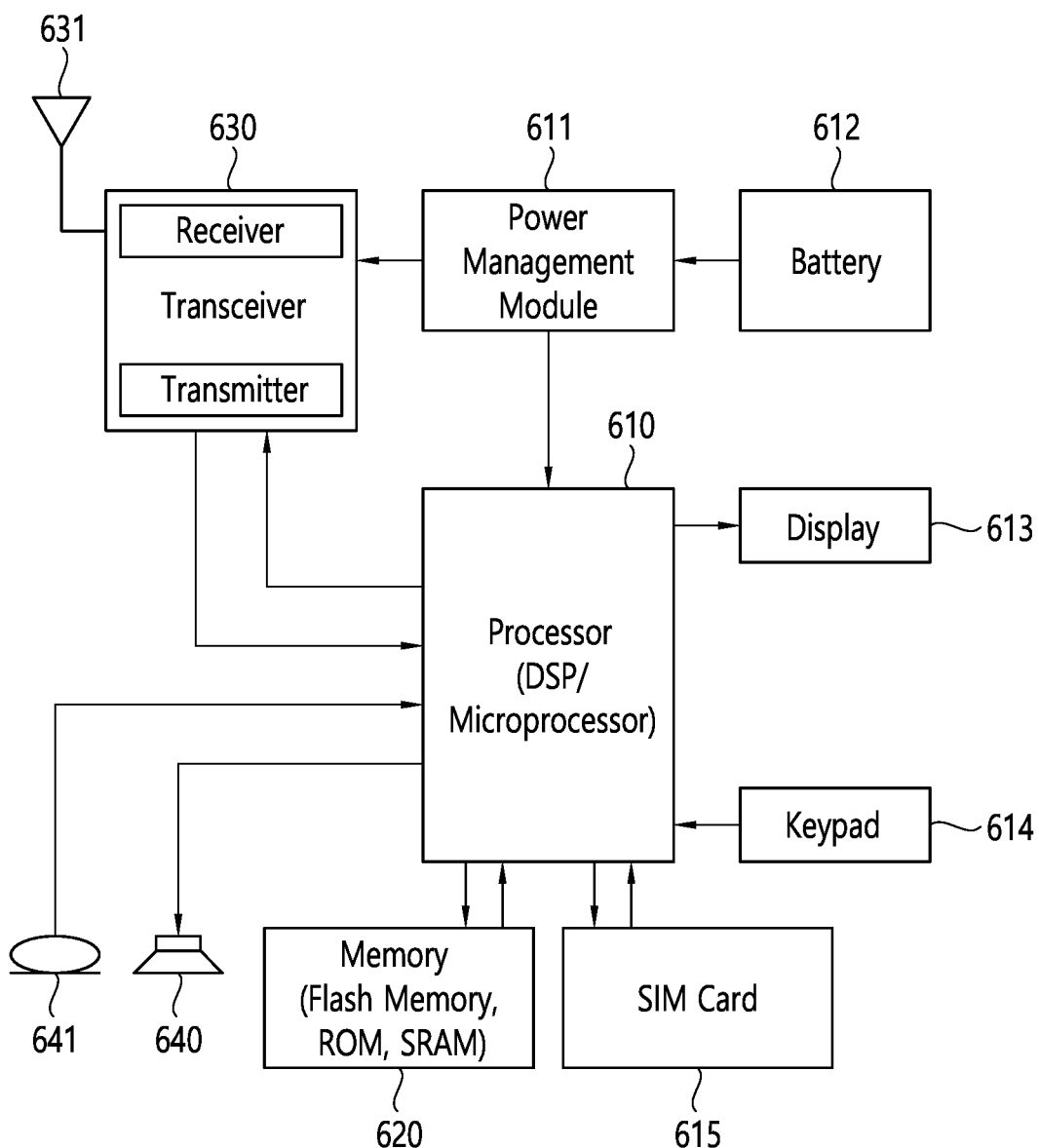
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, a method for performing low latency communication may be described. Low latency communication may refer to a technology for supporting time delay-sensitive traffic (i.e., low latency traffic). The time delay may mean a latency defined in the IEEE 802.11ax standard.

For example, the time delay may mean a time from when a frame is received into a queue of the MAC layer until the frame is deleted from the queue of the MAC layer. Specifically, the frame may come into the queue of the MAC layer (layer) of the transmitting STA (e.g., AP). Thereafter, the frame may be transmitted through the PHY layer of the transmitting STA. The frame may be successfully received by the receiving STA. The transmitting STA may receive an ACK/Block ACK frame or the like from the receiving STA. The transmitting STA may delete the frame from the queue of the MAC layer. Here, the time delay may mean a time from when a frame is received into the queue of the MAC layer until the frame is deleted from the queue of the MAC layer. Hereinafter, for convenience of description, the transmitting STA may be referred to as an access point (AP). Also, the receiving STA may be referred to as an STA.

Various technologies may be required to support time delay-sensitive traffic. For example, a low-latency frame transmission method, a low-latency retransmission method, a low-latency channel contention method, or a low-latency signaling method may be required.

As an example, the low latency frame transmission method (or low latency communication technology) may mean a technique for reducing a time delay when transmitting a data frame. As another example, the low-latency retransmission method may mean a technique for reducing a time delay when the data frame is retransmitted when transmission of the data frame fails. As another example, the low-latency channel contention method may refer to a technique for reducing time by improving the channel contention method. As another example, the low-latency signaling method may refer to a signaling technology for exchanging information related to low-latency communication between the STA and the AP to perform the low-latency communication.

Hereinafter, the present specification may propose various techniques for supporting traffic sensitive to the above-described time delay. Also, the traffic may include various types of traffic. For example, the traffic may be classified into at least two types of traffic. As an example, the first traffic may be traffic sensitive to the time delay. The second traffic may be traffic that is not sensitive to the time delay. Classification of the traffic according to the time delay is only one example, and classification criteria may be set in various ways. For example, the classification criterion may include at least one of time delay, whether to perform a machine type communication, or importance.

Hereinafter, traffic described in the present specification may refer to a type of traffic different from conventional traffic. For example, the traffic described herein below may mean traffic sensitive to the time delay.

Figure 20:
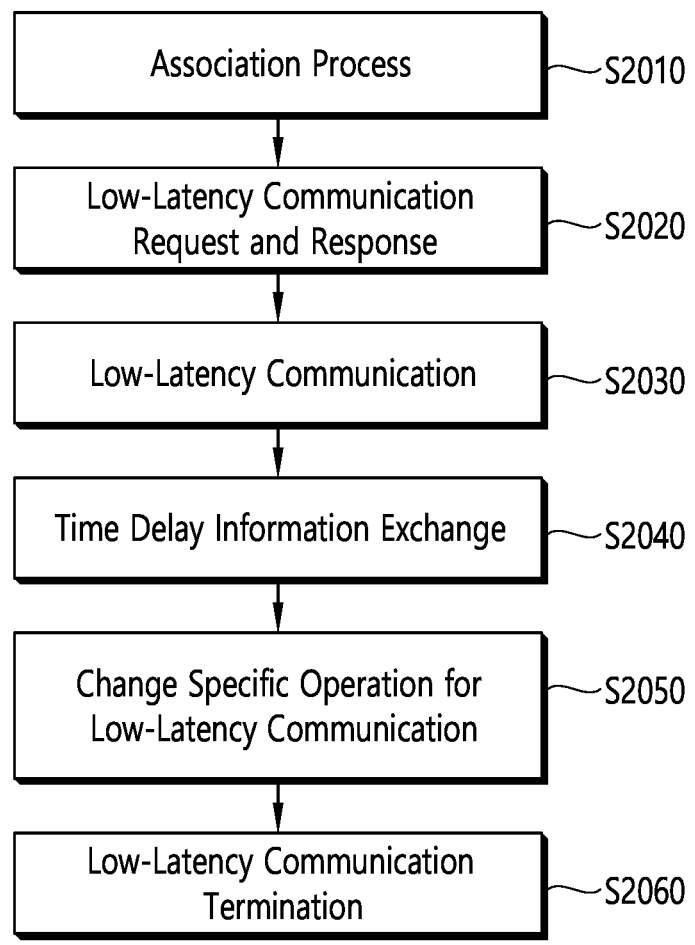
FIG. 20 is a flowchart of an operation for performing low latency communication.

FIG. 20 is a flowchart of an operation for performing low latency communication.

Referring to FIG. 20 the AP and the STA may perform steps S2010 to S2060. Some of the steps described above may not be essential. Accordingly, some steps may be omitted. In addition, since the order of the above-described steps is exemplary, the order of performing each step may vary. Also, only one of the above-described steps may have an independent technical meaning.

In step S2010, the AP and the STA may perform an association process. Specifically, the AP and the STA may exchange information related to a low-latency function. Information related to the low-latency function may include information related to whether or not to support a low-latency communication function.

In step S2020, the AP and STA may transmit and receive a low-latency communication request frame and transmit/receive a low-latency communication response frame. For example, uplink traffic may occur in the STA. The STA may request the AP to perform the low-latency communication based on the uplink traffic. That is, the STA may transmit a low-latency communication request frame to the AP. The AP may transmit a low-latency communication response frame to the STA based on the low-latency communication request frame.

As another example, downlink traffic may be generated from the AP. The AP may transmit information indicating that the AP will perform the low-latency communication to the STA based on the downlink traffic. That is, the AP may transmit a low-latency communication request frame to the STA. The STA may transmit a low-latency communication response frame to the AP based on the low-latency communication request frame. In the case of the downlink traffic, even if the STA does not transmit a low-latency communication response frame to the AP, the AP and the STA may perform the low-latency communication.

In step S2030, the AP and the STA may exchange time delay information (or information on time delay). AP and STA may exchange time delay information of current traffic while the low-latency communication is performed. For example, the AP and the STA may exchange the current traffic time delay status. The AP and the STA may exchange the time delay information periodically or exchange the time delay information when necessary.

In step S2040, the AP and the STA may change a specific operation for the low-latency communication. The AP and the STA may change or maintain a specific operation for the low-latency communication based on the current time delay.

In step S2050, the AP and the STA may terminate the low-latency communication. The AP and the STA may request and respond to terminate the low-latency communication based on that all of the traffic transmitted through the low-latency communication are transmitted.

Hereinafter, with respect to each step of FIG. 20, specific operations of the AP and the STA may be described. Accordingly, FIGS. 21 to 31 may relate to each step of FIG. 20.

(1) Association Process for Low Latency Communication

The following technical features may be related to step S2010. For example, the following technical features may be used in the process of performing step S2010. Alternatively, the following technical features may be performed in a step other than the step S2010.

The AP supporting the low-latency communication function may include information related to whether the low-latency communication function is supported in the Beacon frame or the Probe response frame. Thereafter, the AP may transmit the Beacon frame or the Probe response frame. Information related to whether to support the low-latency communication function may be included in the EHT Capability information element field.

FIG. 21 shows an example of EHT Capability information element field configuration.

Referring to FIG. 21, the EHT Capability information element field 2100 may include a Multi-band support field 2110, a Low Latency support field 2120, a 16-Stream support field 2130, or a 320 MHz support field 2140. The EHT Capability information element field may include capability information for main technologies applied in EHT.

For example, the Low Latency support field 2120 may include capability information for a technology related to a low latency communication of an STA or an AP. For example, the STA may transmit a frame (or PPDU) including the EHT Capability information element field 2100 to the AP. The STA may transmit information that it can support the low-latency communication to the AP through the EHT Capability information element field 2100. In addition, the AP may also transmit information to the STA that it can support the low-latency communication through the EHT Capability information element field 2100 to the STA.

(2) Low Latency Communication Request and Response Process

The following technical features may be related to step S2020. For example, the following technical features may be used in the process of performing step S2020. Alternatively, the following technical features may be performed in steps other than step S2020.

When traffic (e.g., traffic sensitive to time delay) occurs, the STA and the AP may exchange information related to the traffic. For example, the STA and the AP may exchange information related to the traffic through a Traffic Specification (TSPEC) element field. In addition, the STA and the AP may exchange information related to the traffic and may exchange information related to the low-latency communication technology together.

FIG. 22 shows an example of the TSPEC element field configuration.

Referring to FIG. 22, at least one field among subfields of the TSPEC element field 2200 may be used to exchange information related to traffic. For example, the TSPEC element field 2200 may include a plurality of subfields for information related to the traffic. A field related to a time delay among a plurality of subfields for the information on the traffic may be a Delay Bound field. The Delay Bound field may include information related to an allowable maximum time delay value. Additionally, the Delay Bound field may further include information related to an average Delay or a worst-case Delay.

According to an embodiment, information related to the traffic may be included in a field other than the Delay Bound field. For example, a TS Info field may include information related to the traffic. As an example, 1-bit of the Traffic Stream (TS) Info field may include information related to the traffic.

According to an embodiment, a Mean Delay field may be additionally defined in addition to the Delay Bound field. The Mean Delay field may include information related to both the maximum allowable time delay value and the average time delay value.

According to an embodiment, when transmitting and receiving traffic sensitive to the time delay, it may be important to consider a jitter value of the time delay. Accordingly, in the present specification, a method of adding a field including information related to the jitter value of the time delay to the TSPEC element field may be proposed. Additionally, a method of adding a field including packet loss requirement information to the TSPEC element field may be proposed.

Figure 23:
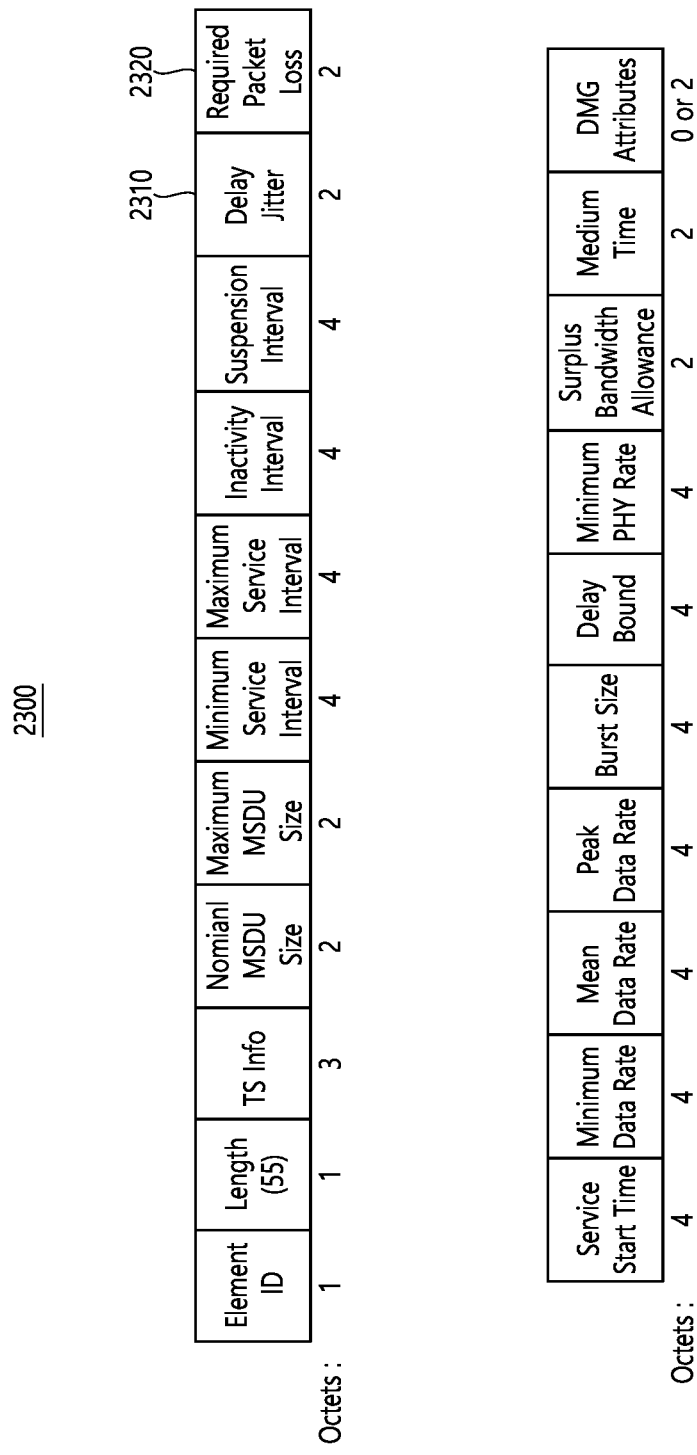
FIG. 23 shows another example of the TSPEC element field configuration.

FIG. 23 shows another example of the TSPEC element field configuration.

Referring to FIG. 23, the TSPEC element field 2300 may further include a Delay Jitter field 2310 and/or a Required Packet Loss field 2320 in addition to the TSPEC element field 2200 of FIG. 22.

Specifically, for traffic sensitive to time delay (i.e., traffic for which latency is important), Delay Bound information (i.e., maximum allowable time delay value) of the TSPEC field 2300 may be an important indicator. In addition, the delay jitter value required for the traffic and the probability that a specific packet is lost after the maximum allowable time delay value may also be important performance indicators for the traffic. Accordingly, the Delay Jitter value and Required Packet Loss value of the traffic may be added to the TSPEC element field 2310. That is, the Delay Jitter field 2310 may include information related to the Delay Jitter value. The Required Packet Loss field 2320 may include information related to the Required Packet Loss value. In other words, the Required Packet Loss field 2320 may include information related to the probability that a specific packet is lost after the maximum allowable time delay value has passed.

Hereinafter, an example in which an STA and an AP exchange information related to the traffic may be described. For example, the STA may transmit a low-latency communication request frame. AP may transmit a low-latency communication response frame.

The low-latency communication request frame may include first information for performing the low-latency communication. The first information may include at least one of information for requesting a parameter for the low-latency communication and information related to the traffic. The low-latency communication response frame may include second information for performing the low-latency communication. The second information may include information related to a parameter for the low-latency communication. Thereafter, the STA and AP may perform the low-latency communication based on the first information and the second information.

The low-latency communication request frame may be referred to by various terms. For example, it may be referred to as a low-latency request frame, a request frame, a first frame or a first PPDU. The low-latency communication response frame may also be referred to by various terms. For example, it may be referred to as a low-latency response frame, a response frame, a second frame or a second PPDU.

The operation of exchanging information related to the above-described traffic and performing the low-latency communication may be described below.

Figure 24:
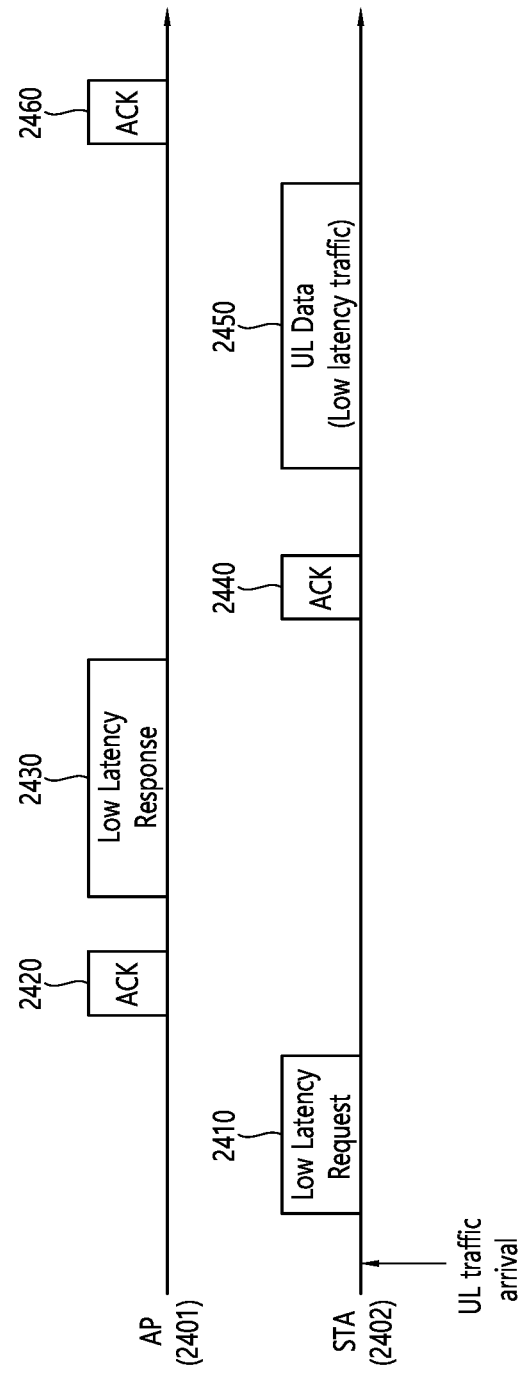
FIG. 24 shows an example of low latency communication request and response process.

FIG. 24 shows an example of low latency communication request and response process.

Referring to FIG. 24, after the AP 2401 and the STA 2402 exchange information related to whether to support the low-latency communication function, low-latency traffic may occur. FIG. 24 shows an embodiment when uplink traffic occurs. Even when downlink traffic occurs, the AP 2401 and the STA may operate similarly.

According to an embodiment, the uplink traffic may be generated/arrived at the STA 2402. Thereafter, the STA 2402 may request the low-latency operation through the Latency Request frame 2410 including information related to the traffic. The AP 2401 may receive a Latency Request frame 2410 from the STA 2402. The AP 2401 may transmit an ACK frame 2420 to the STA 2402 in response to the Latency Request frame 2410.

The AP 2401 may transmit a Low Latency Response frame 2430 including information related to the low-latency communication to be operated by the STA 2402 to the STA 2402. The STA 2402 may receive a Low Latency Response frame 2430. The STA 2402 may transmit an ACK frame 2440 to the AP 2401 in response to the Latency Response frame 2430.

The AP 2401 and the STA 2402 may perform the low-latency communication based on the Latency Request frame 2410 and the Latency Response frame 2430. According to an embodiment, when downlink traffic occurs, the AP 2401 may transmit a Low Latency Request frame 2410 to the STA 2430. However, transmission of the Low Latency Response frame 2430 from the STA 2402 may be omitted.

When transmitting low latency traffic, if the maximum allowable time delay is exceeded, the transmission of low latency traffic may be canceled. A frame for transmitting the low-latency traffic may be dropped. When a frame for transmitting the low-latency traffic is dropped, performance may be degraded. Therefore, it may be important to transmit the low-latency traffic within the maximum allowable time delay.

However, in the current IEEE 802.11 standard, the time delay required for a frame is not considered. Accordingly, a frame in which the time delay already required is close to the maximum allowable time delay may be dropped with a very high probability.

If the already spent time delay value is increased by more than a certain percentage of the maximum allowable time delay value, the drop may be highly likely to occur in the current transmission method of the STA 2402. Therefore, a separate transmission method may be required to prevent the above situation. For example, a transmission method that gives a priority to a frame/traffic compared to the conventional transmission method may be proposed. The transmission method may be used only under specific conditions negotiated by the STA 2402 and the AP 2401.

In the present specification, a case in which the already consumed time delay value increases by a predetermined ratio or more of the maximum allowable time value may be defined as the worst case. In the worst case, the AP 2401 or the STA 2402 may transmit traffic by using a transmission method having a priority over the conventional transmission method.

For the transmission method in the worst case, separate EDCA parameters having smaller parameter values than the conventional EDCA parameters or than the MU EDCA parameters may be used. According to an embodiment, in the worst case, like a beacon frame, a Point Coordination Function Inter-Frame Space (PIFS) may be used instead of an Arbitration Inter-Frame Space (AIFS).

Hereinafter, an example of information included in the Low Latency Request frame 2410 or the Low Latency Response frame 2430 may be described. Based on the uplink traffic and the downlink traffic, information transmitted by the AP 2401 and the STA 2402 may be configured differently.

1) Example of Information Included in the Low Latency Request Frame 2410 or the Low Latency Response Frame 2430 when Uplink Traffic Occurs i) Information transmitted by the STA 2402 to the AP 2401 (at least one of the following examples may be included).

Uplink traffic information: For example, the uplink traffic information may include specific information related to uplink traffic such as a maximum allowable time delay (average or worst-case) value, a maximum allowable delay jitter value, a minimum required throughput value and/or an average packet size.

Operating parameter request value for low latency communication: For example, the STA 2402 may request EDCA parameters to be used (e.g., CWmin, CWmax, AIFSn, etc.) or UL OFDMA resource allocation request information, etc. from the AP 2401.

Time delay status report related information: For example, for uplink traffic, a receiving side may be the AP 2401. The AP 2401 may have to report the time delay status to the STA 2402. Accordingly, the STA 2402 may transmit information related to a time delay reporting period or a time delay reporting condition to the AP 2401.

Worst case negotiation information: For example, the worst-case negotiation information may include information related to a condition for the worst case. For example, the STA 2402 may designate the ratio of a time delay value required for frame transmission to the maximum allowable time delay value. The STA 2402 may recognize a case in which the (already spent) time delay value is higher than the ratio defined by the field including the worst-case negotiation information as the worst case. In the worst case, the STA 2402 may transmit the frame by using the transmission method with a priority.

For example, a field including the worst-case negotiation information (hereinafter, worst-case field) may be set/allocated with 3 bits. The worst-case field may be set to a value of '0' to '7'. In this case, '0' may be set for 60%, '1' may be set for 65%, '2' may be set for 70%, '3' may be set for 75%, '4' may be set for 80%, '5' may be set for 85%, '6' may be set for 90%, and '7' may be set for 95%. After setting the value of the worst-case field to '6', the STA 2402 may transmit a frame including the worst-case field to the AP 2401. The AP 2401 may grant the ratio related to the value of the worst-case field. Thereafter, the STA 2402 may transmit the frame by using a transmission method having a priority only for a frame in which the (already spent) time delay value exceeds 90% of the maximum allowable time delay value.

ii) information transmitted by the AP 2401 to the STA 2402 (at least one of the following examples may be included).

Operating parameter value for low latency communication: For example, the AP 2401 may transmit, to the STA 2402, EDCA parameters (e.g., CWmin, CWmax, AIFSn, etc.) or UL OFDMA resource allocation schedule information, etc. to be used by the STA 2402 transmitting traffic.

Time delay status report (report) related parameters: For example, the AP 2401 may determine a time delay reporting period or a time delay reporting period condition, and then transmit it to the STA 2402.

Worst case negotiation information: For example, the worst-case negotiation information may include information related to a condition for the worst case. For example, the AP 2401 may designate the ratio of a time delay value required for frame transmission to the maximum allowable time delay value. The AP 2401 may recognize a case in which the (already spent) time delay value is higher than the ratio defined by the field including the worst-case negotiation information as the worst case. In the worst case, the AP 2401 may transmit the frame by using the transmission method with a priority.

For example, a field including the worst-case negotiation information (hereinafter, worst-case field) may be set/allocated with 3 bits. The worst-case field may be set to a value of '0' to '7'. In this case, '0' may be set for 60%, '1' may be set for 65%, '2' may be set for 70%, '3' may be set for 75%, '4' may be set for 80%, '5' may be set for 85%, '6' may be set for 90%, and '7' may be set for 95%. After setting the value of the worst-case field to '5', the AP 2401 may transmit a frame including the worst-case field to the AP 2401. Thereafter, the STA 2402 may transmit the frame by using a transmission method having a priority only for a frame in which the (already spent) time delay value exceeds 86% of the maximum allowable time delay value. In other words, the STA 2402 may perform the low latency communication only for frames in which the (already spent) time delay value exceeds 85% of the maximum allowable time delay value.

2) Example of Information Included in the Low Latency Request Frame 2410 or the Low Latency Response Frame 2430 when Downlink Traffic Occurs i) Information transmitted by the STA 2402 to the AP 2401 (at least one of the following examples may be included).

Downlink traffic information: For example, the downlink traffic information may include specific information related to a maximum allowable time delay (average or worst-case) value, a maximum allowable delay jitter value, a minimum required throughput value and/or an average packet size for downlink traffic.

Parameter information related to time delay status report: For example, for downlink traffic, the receiving side may be the STA 2402. The STA 2402 may have to report the time delay status to the AP 2401. Accordingly, the AP 2401 may transmit information related to a time delay report period or a time delay report condition to the STA 2402.

After exchanging information for the above-described traffic and low-latency communication, the AP 2401 and the STA 2402 may perform the low-latency communication only for the above-described traffic.

(3) Low Latency Communication Process

The following technical features may be related to step S2030. For example, the following technical features may be used in the process of performing step S2030. Alternatively, the following technical features may be performed in steps other than step S2030.

1) Low Latency Communication Method of STA and AP
   Selection of Modulation Coding Scheme (MCS): A method of selecting an MCS may be variously configured. However, in most cases, an MCS may be selected to maximize throughput. However, an MCS for maximizing throughput and an MCS for minimizing time delay may be different. Therefore, when transmitting traffic sensitive to time delay, it may be necessary to select an MCS that minimizes time delay. If the MCS is set to the highest while keeping the Packet Error Rate (PER) close to 0%, the time delay can be minimized.
   Broadband/wideband transmission: When using a broadband transmitting, transmission time may be reduced. Therefore, the broadband transmission has an effect of reducing the time delay of the traffic. Therefore, when transmitting traffic sensitive to time delay, the STA or AP can minimize the time delay by using the widest/broadest bandwidth.

For example, both the STA and the AP may distinguish between a first MCS selection scheme for time delay-sensitive traffic (i.e., low-latency traffic) and a second MCS selection scheme for normal traffic. The first MCS selection scheme and the second MCS selection scheme may be negotiated or selected through S2010 and/or S2020.

Additionally or alternatively), both the STA and the AP can distinguish between the first band transmission scheme for the low-latency traffic and the second band transmission scheme for the normal traffic. The first band transmission scheme and the second band transmission scheme may be negotiated or selected through S2010 and/or S2020.

2) STA's Low Latency Communication Method
   Appropriate use of EDCA parameter(s): A station (STA) can adjust its priority in channel contention with other STAs by adjusting EDCA parameter(s) (CWmin, CWmax, AIFSn, etc.). The STA may transmit the traffic earlier than other STAs by adjusting the EDCA parameter(s) as the traffic is sensitive to the time delay.
   UL OFDMA resource allocation: Based on the characteristics of the traffic, the AP may properly allocate the UL OFDMA resource to the STA. The AP can reduce the time delay of the corresponding traffic through the process of allocating UL OFDMA resources. According to an embodiment, the STA may request allocation of a UL OFDMA resource to the AP based on characteristics of traffic to be transmitted.

For example, the STA may distinguish between a first EDCA parameter for traffic sensitive to time delay (i.e., low latency traffic) and a second EDCA parameter for normal traffic. The first EDCA parameter and the second EDCA parameter may be negotiated or selected through S2010 and/or S2020.

Additionally or alternatively, the STA may use a first UL OFDMA resource allocation scheme for the low-latency traffic and a second UL OFDMA resource allocation scheme for the normal traffic to be distinguished. The first UL OFDMA resource allocation scheme and the second UL OFDMA resource allocation scheme may be negotiated or selected through S2010 and/or S2020.

3) AP's Low Latency Communication Method
   DL OFDMA resource allocation: The AP can reduce the time delay by allocating the DL OFDMA resource of the traffic based on the time delay.

For example, the AP may use a distinction between a first DL OFDMA resource allocation scheme for the time delay-sensitive traffic (i.e., low-latency traffic) and a second DL OFDMA resource allocation scheme for the normal traffic. The first DL OFDMA resource allocation scheme and the second DL OFDMA resource allocation scheme may be negotiated or selected through S2010 and/or S2020.

(4) Time Delay Information Exchange Process

The following technical features may be related to step S2040. For example, the following technical features may be used in the process of performing step S2040. Alternatively, the following technical features may be performed in steps other than step S2040.

Figure 25:
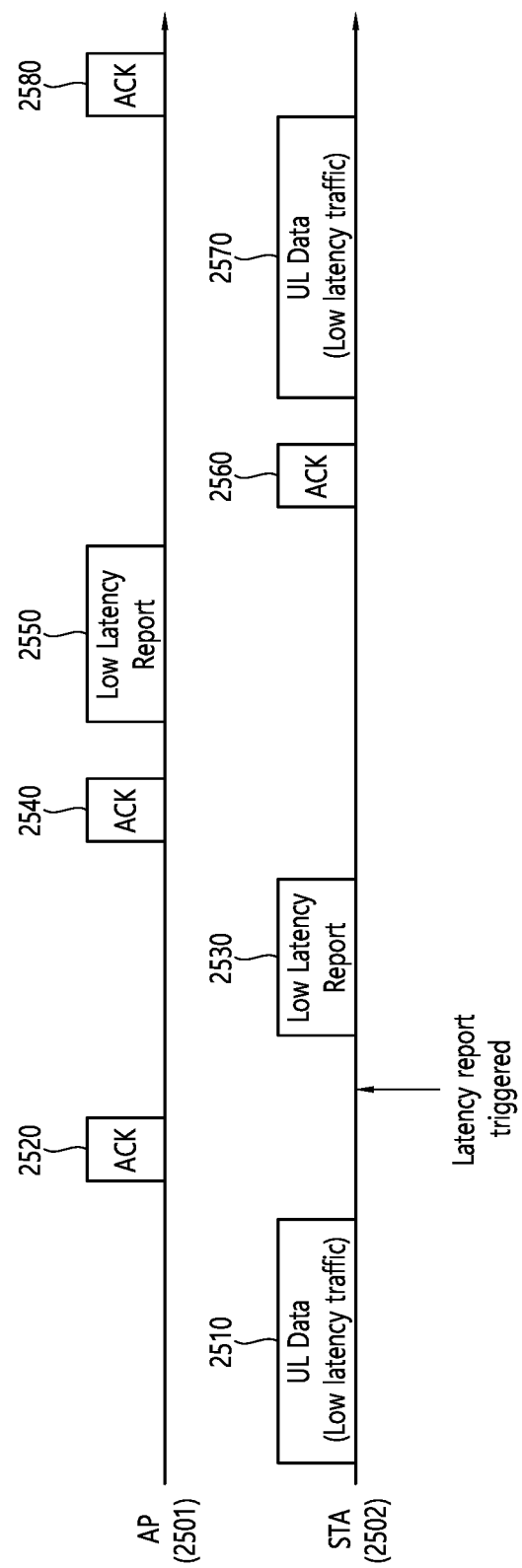
FIG. 25 shows an example of a process of exchanging time delay information.

FIG. 25 shows an example of a process of exchanging time delay information.

Referring to FIG. 25, while the STA 2502 is transmitting UL Data 2510, the AP 2501 and the STA 2502 may report a time delay status. Specifically, the STA 2502 may transmit UL Data 2510 to the AP 2501. The AP 2501 may transmit an ACK 2520 to the STA 2502 in response to the UL Data 2510.

Thereafter, the AP 2501 and the STA 2502 may report the time delay status at regular time intervals during the low-latency traffic transmission. In addition, the AP 2501 and the STA 2502 may report the time delay status under certain conditions during the low-latency traffic transmission.

For example, the STA 2502 may transmit a Low Latency Report frame 2530 to the AP 2501. The AP 2501 may transmit an ACK 2540 to the STA 2502 in response to the Low Latency Report frame 2530. Also, the AP 2501 may transmit a Low Latency Report frame 2550 to the STA 2502. The STA 2502 may transmit an ACK 2560 to the AP 2501 in response to the Low Latency Report frame 2550.

After the exchange of the Low Latency Report frame 2530 and the Low Latency Report frame 2550 is completed, the STA 2502 may transmit uplink traffic to the AP 2501 again. As an example, the STA 2502 may transmit UL Data 2570 to the AP 2501. The AP 2501 may transmit an ACK 2580 to the STA 2502 in response to the UL Data 2570.

Hereinafter, a condition for transmitting the Low Latency Report frames 2530 and 2550 and information included in the Low Latency Report frame 2530 and 2550 may be described.

The AP 2501 and the STA 2502 may transmit information related to a time delay value of the traffic currently being transmitted/received by the AP 2501 and the STA 2502 to each other. Information related to the time delay value of the traffic and the like may be included in the aforementioned Low Latency Report frames 2530 and 2550. As a transmitter/receiver of the traffic exchanges information related to the current situation with each other, the AP 2501 and the STA 2502 can adjust a low latency transmission method. This has the effect of further improving the performance. The time or condition for reporting the time delay status, etc., may be described later.

1) Time to Report

The time for reporting the time delay status may be set in various ways, and at least one of the following methods may be used.

i) Periodically reporting method: The AP 2501 and the STA 2502 may report information related to the current situation based on a predetermined period. Before performing the low-latency communication, the AP 2501 and the STA 2502 may exchange information related to the traffic and the low-latency transmission method. At this time, information related to the reporting period may also be exchanged.

ii) Conditional reporting method: The AP 2501 and the STA 2502 may report information related to the current situation according to a pre-specified condition. Before performing the low-latency communication, AP 2501 and STA 2502 may exchange information related to the traffic and the low-latency transmission method. At this time, information related to the reporting condition may also be exchanged. The reporting condition may be described below. At least one of the following conditions may be used simultaneously.

When the current time delay value is greater than a specific value: The AP 2501 and the STA 2502 may report the time delay status when the performance at the receiving side has been deteriorated or there is a possibility that the time delay value may be increased.

When the traffic requirement is changed: The time delay request value of the current traffic may be changed. For example, the coding method of video/audio may be changed. AP 2501 and STA 2502, by reporting the variation value, may perform adjustments to the low-latency transmission method.

When buffering takes a long time in the upper layer or time delay traffic is not transmitted properly, the AP 2501 and the STA 2502 may inform the MAC layer of the above situation. Thereafter, the AP 2501 and the STA 2502 may report the time delay status. As an example, the AP 2501 and the STA 2502 may report a specific time delay value.

2) Reporting Method

A method of reporting the time delay status may be set in various ways, and at least one of the following methods may be used.

i) The AP 2501 may allocate a resource for reporting related to the time delay status by periodically triggering it. For example, the AP 2501 may allocate a resource for reporting the time delay status by periodically transmitting a trigger frame. In the case of UL, the STA 2502 may report the time delay status by using the resource.

ii) The AP 2501 and the STA 2502 may report the time delay status after channel contention by using the general EDCA. According to an embodiment, the AP 2501 and the STA 2502 may perform channel contention through an EDCA parameter for the low-latency communication.

2) Information to be Reported

The reported information may be configured in various ways, and at least one of the following information may be used. Hereinafter, a device/station that reports the time delay status may be referred to as a transmitter or a transmitting side. Also, a device receiving a report related to the time delay status may be called a receiver or a receiving side. For example, the transmitting side may be the AP 2501 and the receiving side may be the STA 2502. Also, for another example, the transmitting side may be the STA 2502, and the receiving side may be the AP 2501.

i) Current time delay value: The transmitting/receiving side (e.g., the AP 2501 and the STA 2502) may exchange the recently measured time delay value with each other. However, when the transmitting side and the receiving side measure the time delay value, respectively, the values measured at the transmitting side and the receiving side may come out differently. Accordingly, the current time delay value can be exchanged by the transmitter/receiver. Through this, the transmitter/receiver can accurately determine the current situation.

The transmitting side can calculate a (time) interval by measuring the time when a medium access control service data unit (MSDU) arrives at and leaves the MAC queue.

The receiver can measure how late each frame is actually received based on the time each frame should be received.

Alternatively, when the transmitting side transmits a data frame, it can periodically transmit information related to the time when the data frame arrives at the transmitting side MAC queue to the receiving side. The receiving side may measure a time delay value based on the time when the data frame arrives at the MAC queue of the transmitting side.

ii) In case of exceeding the maximum allowable time delay value, the number of frames exceeding the maximum allowable time delay value or sequence information of the frame: When the number of frames exceeding the maximum allowable time delay value or sequence information of the frame is transmitted, the transmitting side may check which frame exceeds the maximum allowable time delay value. Accordingly, the transmitting side may perform frame retransmission to reduce the maximum allowable time delay.

iii) Time delay jitter value: Transmitter/receiver can exchange the recently measured time delay jitter value. When the time delay jitter value is measured by the transmitting side and the receiving side, respectively, the values measured at the transmitting side and the receiving side may come out differently. Accordingly, the time delay jitter value can be exchanged by the transmitter/receiver. Through this, the transmitter/receiver can accurately determine the current situation.

iv) If the transmitter/receiver periodically reports the time delay value, the transmitter/receiver can measure the time delay value for a certain time period before reporting the time delay value and then report the measured time delay value.

v) If the transmitter/receiver reports a time delay value based on a specified condition, the transmitter/receiver may report the time delay value that satisfies the specified condition. For example, when the time delay value exceeds a specified value, the transmitting/receiving side may report the time delay value.

v) Changed traffic requirement values: If the required value of traffic is changed, the changed requirement value may be transmitted.

3) Reporting Format

The reporting format may be configured in various ways and reported information may be included in a MAC frame based on at least one of the following methods.

i) Reported information may be defined as an element. The reported information may be aggregated with data of traffic. Accordingly, the reported information may be transmitted in A-MPDU format together with the traffic data.

ii) Some of the reported information may be included in the MAC Header. According to an embodiment, after the reported information is compressed, it may be included in the MAC Header.

4) Operation after the Report

An operation after the report may be configured in various ways, and at least one of the following methods may be used. The following technical features may be related to step S2050 and/or step S2060. For example, the following technical features may be used in the process of performing step S2050 and/or step S2060. Alternatively, the following technical features may be performed in steps other than steps S2050 and/or S2060.

i) The transmitting/receiving side may change the operating parameters for the low latency communication when the time delay value or jitter value does not satisfy the requirements of the current traffic or needs to be further reduced. The transmitting/receiving side may change the operating parameters for the low-latency communication, thereby reducing the time delay value.

ii) Since the time delay value sufficiently satisfies the requirements of the current traffic, even if the time delay value may be further increased, the transmitting/receiving side may change the operating parameters for the low-latency communication. Therefore, the transmitting/receiving side can increase the time delay value by changing the operating parameters for the low-latency communication. The method of changing the operating parameters for the low-latency communication has the effect of improving the performance of other STAs.

iii) If the time delay value is suitable for the requirements of the current traffic, the transmitter/receiver may use the current low latency operating parameter as it is. In other words, the transmitting/receiving side may maintain the current low-latency operating parameters.

According to an embodiment, after the transmission of the traffic sensitive to time delay is finished, the transmitter may notify the receiver that the transmission of the traffic is finished. Thereafter, the transmitting/receiving side may terminate low-latency communication. The termination of the transmission of the traffic may mean that the transmission of all the traffic data is completed, not that the transmission of each traffic data is finished. For example, when the traffic is Voice over Internet Protocol (VoIP), even if there is a silent section, it may be determined that the traffic transmission will be terminated only when all the corresponding calls are finished.

Figure 26:
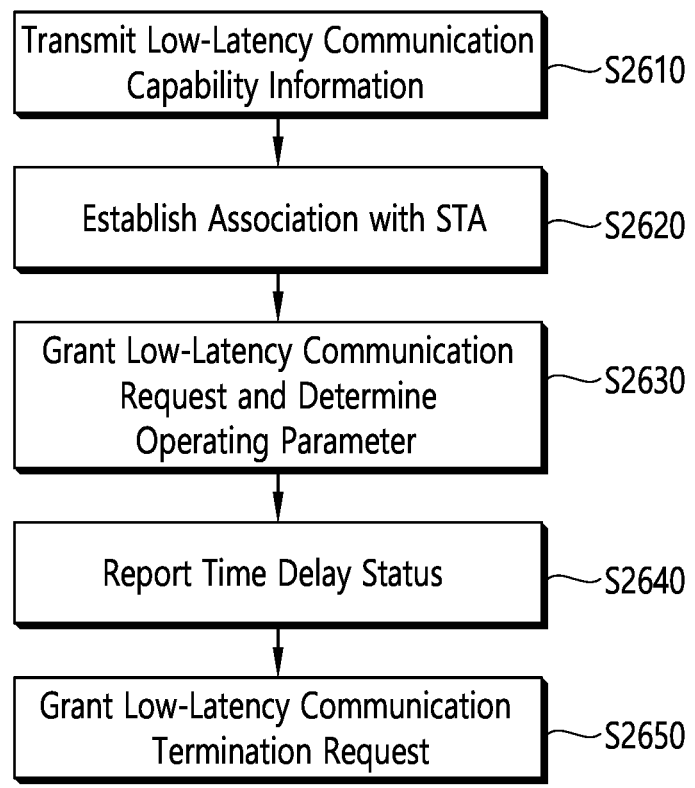
FIG. 26 is a flowchart for explaining an example of an operation of an AP.
Figure 27:
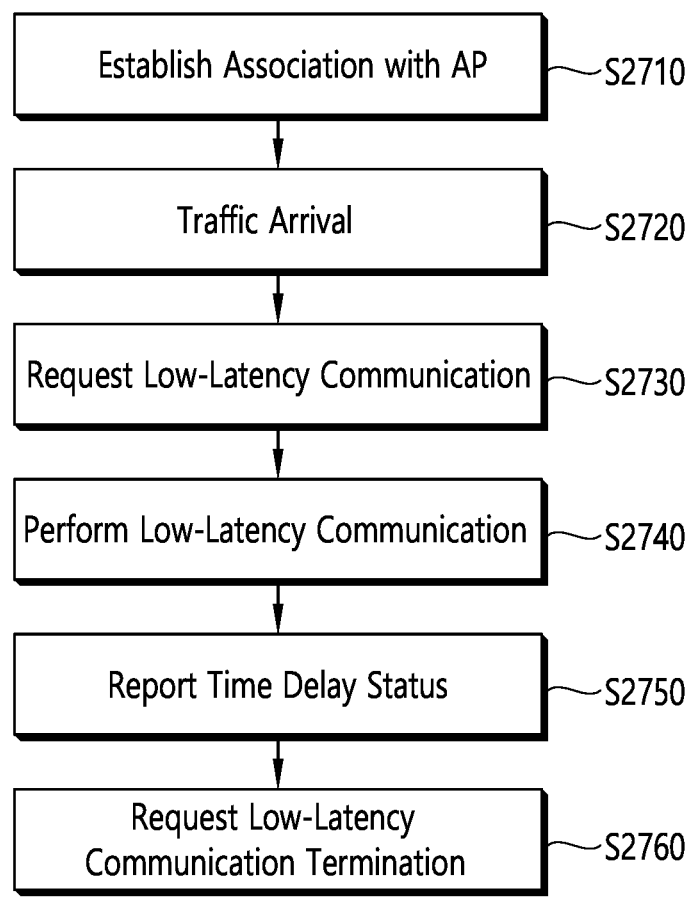
FIG. 27 is a flowchart for explaining an example of an operation of an STA.
Figure 28:
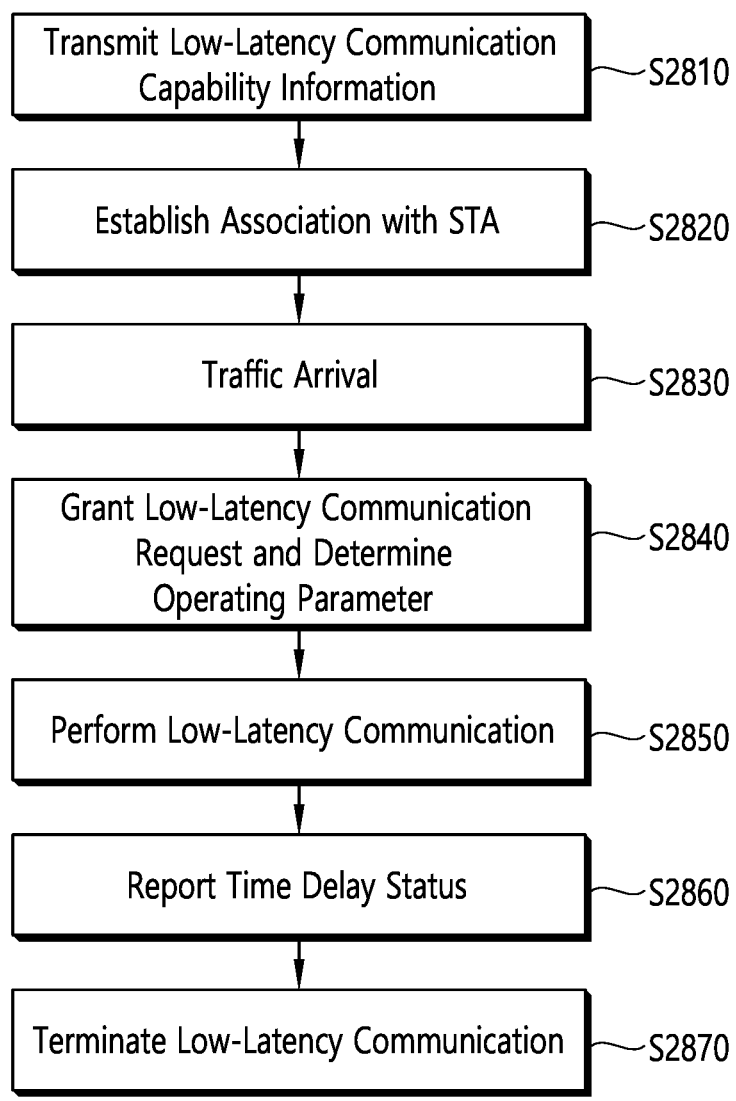
FIG. 28 is a flowchart for explaining another example of the operation of the AP.
Figure 29:
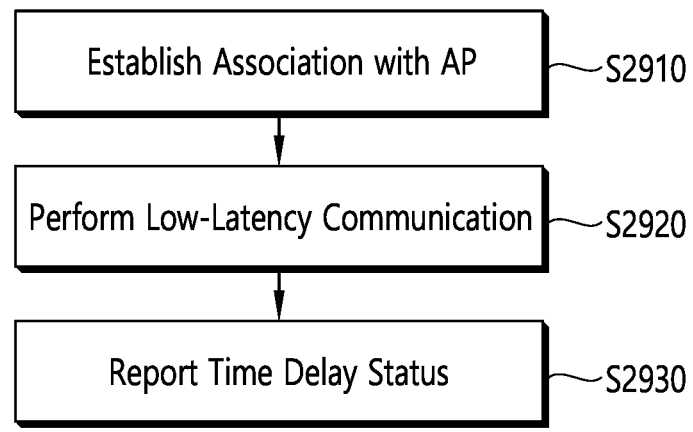
FIG. 29 is a flowchart for explaining another example of an operation of an STA.

Hereinafter, an example of the operation of the AP 2501 and the STA 2502 may be described. FIGS. 26 and 27 may show examples of operations of the AP 2501 and the STA 2502 when the traffic is uplink traffic. FIGS. 28 and 29 show examples of operations of the AP 2501 and the STA 2502 when the traffic is downlink traffic.

FIG. 26 is a flowchart for explaining an example of an operation of an AP.

Referring to FIG. 26, an example of the operation of the AP may be illustrated when the traffic is uplink traffic. In step S2610, the AP may transmit low latency communication capability information to the STA. For example, the AP supporting the low-latency communication function may include information (i.e., low-latency communication capability information) related to whether the low-latency communication function is supported in the Beacon frame or the Probe response frame. As an example, information related to whether to support the low-latency communication function may be included in the EHT Capability information element field. According to an embodiment, the AP may receive low-latency communication capability information from the STA. Step S2610 may be related to step S2010 of FIG. 20.

In step S2620, the AP may establish an association with the STA. The STA may support the low-latency communication function. For example, the AP may perform the operation shown in FIG. 3. As an example, the AP may establish an association with the STA based on at least one of steps S310 to S340 of FIG. 3.

In step S2630, the AP grants the low-latency communication request and may determine the operating parameters for the low-latency communication. According to an embodiment, the AP may receive a Low Latency Request frame from the STA. The Low Latency Request frame may be a frame for requesting the low-latency communication. In addition, the Low Latency Request frame may include information related to the operating parameter request value for the low-latency communication. That is, the AP may receive the parameter value requested by the STA.

The AP may grant the low latency communication request sent by the STA. The AP may transmit a Low Latency Response frame from the STA. In addition, the AP may transmit an operating parameter value for the low-latency communication to the STA through the Low Latency Response frame. For example, the operating parameter value may include at least one of an EDCA parameter (e.g., CWmin, CWmax, AIFSn, etc.) or UL OFDMA resource allocation request information. According to an embodiment, the AP may further transmit a parameter related to the time delay status report or worst-case negotiation information. According to an embodiment, step S2630 may be related to step S2020 of FIG. 20. Thereafter, the AP may perform the low-latency communication with the STA. The AP may receive time delay-sensitive traffic from the STA. The operation of performing the low-latency communication between the AP and the STA may be related to step S2030 of FIG. 20.

In step S2640, the AP may report the time delay status. According to an embodiment, the AP may report the time delay status at regular time intervals while receiving traffic sensitive to time delay (i.e., low-latency traffic). According to an embodiment, while receiving traffic sensitive to the time delay, the AP may report the time delay status under certain conditions. For example, the AP may transmit a Low Latency Report frame to the STA. The STA may transmit an ACK to the AP in response to the Low Latency Report frame.

According to an embodiment, the interval at which the AP reports the time delay status may be set in various ways. For example, the AP may report the time delay status at every designated time interval. The specified time interval may be set when exchanging the low-latency communication capability information.

According to an embodiment, various conditions for the AP to report the time delay status may be set. For example, when the current time delay value is greater than a specific value, the AP may report the time delay status to the STA.

According to an embodiment, the information reported related to the time delay status may be set in various ways. For example, the information reported related to the time delay status may include at least one of information related to a current time delay value and information related to a time delay jitter value.

According to an embodiment, step S2640 may be related to step S2040 of FIG. 20.

In step S2650, the AP may grant the low-latency communication termination request. According to an embodiment, when the AP receives all of the low-latency traffic, the AP may receive the low-latency communication termination request from the STA. AP may grant the request to terminate the low-latency communication. AP may transmit a frame indicating the termination of low-latency communication to the STA. For example, the AP may inform the STA of the termination of the low-latency communication through the ACK frame.

FIG. 27 is a flowchart for explaining an example of an operation of an STA.

Referring to FIG. 27, an example of an operation of an STA may be illustrated when traffic is uplink traffic. In step S2710, the STA may establish an association with the AP. The AP may support a low latency communication function. For example, the STA may perform the operation shown in FIG. 3. As an example, the STA may establish an association with the AP based on at least one of steps S310 to S340 of FIG. 3.

According to an embodiment, the STA may receive low-latency communication capability information from the AP before establishing an association with the AP. For example, the STA may receive information on whether to support the low-latency communication function (i.e., low-latency communication capability information) through a Beacon frame or a Probe response frame. As an example, information on whether to support the low-latency communication function may be included in the EHT Capability information element field. According to an embodiment, the STA may transmit the low-latency communication capability information to the AP. Step S2710 may be related to step S2010 of FIG. 20.

In step S2720, STA's traffic may arrive. In other words, uplink traffic may be generated in the STA. For example, the traffic may include time delay-sensitive traffic (i.e., low-latency traffic).

In step S2730, the STA may request the low-latency communication from the AP. The STA may transmit a Low Latency Request frame to the AP. The Low Latency Request frame may be a frame for requesting the low-latency communication. In addition, the Low Latency Request frame may include information related to the operating parameter request value for the low-latency communication. For example, the operating parameter request value for low-latency communication may include an operating parameter value for transmitting time-delay sensitive traffic. The STA may receive a Low Latency Response frame from the AP in response to the Low Latency Request frame. The Low Latency Response frame may be a frame for granting the low-latency communication. The Low Latency Response frame may include an operating parameter value for the low-latency communication.

In step S2740, the STA may perform the low-latency communication with the AP. According to an embodiment, the STA may perform the low-latency communication based on the operating parameter for the low-latency communication received from the AP. Step S2740 may be related to step S2030 of FIG. 20.

In step S2750, the STA may report the time delay status to the AP. According to an embodiment, the STA may report the time delay status at regular time intervals while transmitting the time delay-sensitive traffic (i.e., low-latency traffic). According to an embodiment, the STA may report the time delay status under certain conditions while transmitting the time delay-sensitive traffic. For example, the STA may transmit a Low Latency Report frame to the AP. The AP may transmit an ACK to the STA in response to the Low Latency Report frame.

According to an embodiment, the interval at which the STA reports the time delay status may be set in various ways. For example, the STA may report the time delay status at every designated time interval. The specified time interval may be set when exchanging the low-latency communication capability information.

According to an embodiment, the conditions for the STA to report the time delay status may be set in various ways. For example, when the current time delay value is greater than a specific value, the STA may report the time delay status to the AP.

According to an embodiment, the information reported related to the time delay status may be set in various ways. For example, the information reported related to the time delay status may include at least one of information about a current time delay value and information about a time delay jitter value.

According to an embodiment, step S2750 may be related to step S2040 of FIG. 20.

In step S2760, the STA may request the AP to terminate the low-latency communication. According to an embodiment, when the STA transmits all of the low-latency traffic, the STA may transmit a low-latency communication termination request to the AP. The AP grants the low-latency communication termination request, and may transmit a frame indicating the low-latency communication termination to the STA. Therefore, the AP may receive a frame indicating the termination of low-latency communication.

According to an embodiment, step S2760 may be related to step S2060 of FIG. 20.

FIG. 28 is a flowchart for explaining another example of the operation of the AP.

Referring to FIG. 28, when the traffic is downlink traffic, an example of the operation of the AP may be shown. In step S2810, the AP may transmit the low latency communication capability information to the STA. Step S2810 may be related to step S2610 of FIG. 26.

In step S2820, the AP may establish an association with the STA. Step S2820 may be related to step S2620 of FIG. 26.

In step S2830, AP's traffic may arrive. In other words, uplink traffic may be generated from the AP. For example, the traffic may include the time delay-sensitive traffic (i.e., low-latency traffic).

In step S2840, the AP may grant the low-latency communication request, and determine the operating parameters for low-latency communication. Step S2830 may be related to step S2630 of FIG. 26.

In step S2850, the AP may perform the low-latency communication with the STA. The AP may transmit time delay-sensitive traffic to the STA. Step S2850 may be related to step S2030 of FIG. 20.

In step S2860, the AP may report the time delay status. Step S2860 may be related to step S2640 of FIG. 26.

In step S2670, the AP may terminate the low-latency communication. According to an embodiment, the AP may transmit all traffic sensitive to time delay. AP may transmit the low-latency communication termination request to the STA. Thereafter, the AP may terminate low-latency communication with the STA.

FIG. 29 is a flowchart for explaining another example of an operation of an STA.

Referring to FIG. 29, an example of the operation of the STA may be illustrated when the traffic is downlink traffic. In step S2910, the STA may establish an association with the AP. The AP may support a low latency communication function. Step S2910 may be related to step S2710 of FIG. 27.

In step S2920, the STA may perform the low-latency communication with the AP. According to an embodiment, the STA may perform the low-latency communication based on the operating parameter for the low-latency communication received from the AP. Step S2920 may be related to step S2740 of FIG. 27.

In step S2930, the STA may report the time delay status to the AP. According to an embodiment, the STA may measure/obtain information for reporting the time delay status while performing the low-latency communication with the AP. For example, the STA may measure/obtain information related to a current time delay value or information related to a time delay jitter value. When reporting the time delay status, the STA may transmit the measured information to the AP. Step S2930 may be related to step S2750 of FIG. 27.

Although not shown, the STA may request the AP to terminate the low-latency communication. The operation of requesting that the STA terminate the low-latency communication may be related to step S2760 of FIG.

Figure 30:
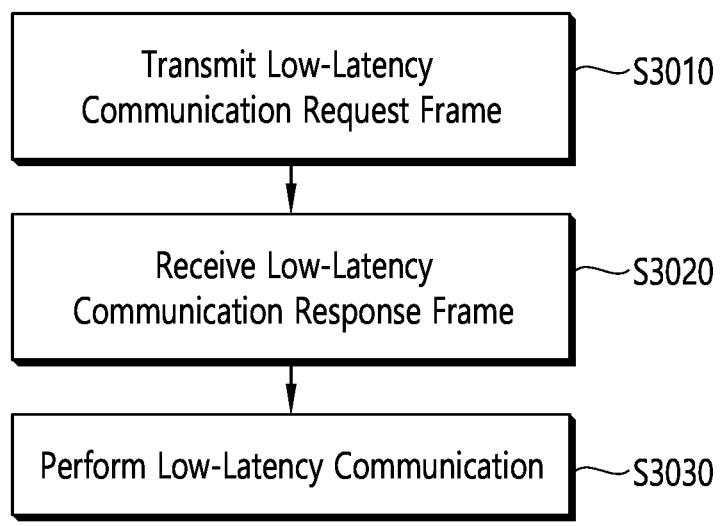
FIG. 30 is a flowchart illustrating an operation of a receiving STA.

FIG. 30 is a flowchart illustrating an operation of a receiving STA.

Referring to FIG. 30, in step S3010, the receiving STA (e.g., STAs 2402 and 2502) may transmit a low-latency communication request frame. According to an embodiment, traffic may occur in the receiving STA. The traffic may include the time delay-sensitive traffic (i.e., low-latency traffic). The receiving STA may transmit the low-latency communication request frame to the transmitting STA (e.g., APs 2401 and 2501) based on the traffic.

According to an embodiment, the low-latency communication request frame may include first information for performing the low-latency communication. The first information may include at least one of information requesting a parameter for the low-latency communication and information related to traffic.

For example, the parameter for the low-latency communication may include information related to an EDCA (Enhanced Distributed Channel Access) parameter and/or information related to the UL OFDMA (Uplink orthogonal frequency division multiple access) resource allocation. As another example, the information related to the traffic may include information related to a jitter value or information related to an average packet size.

According to an embodiment, the low-latency communication request frame may include a TSPEC element field. The TSPEC element field may include the first information. In other words, the first information may be included in the TSPEC element field. For example, the TSPEC element field may include a Delay jitter field for information related to a jitter value. As another example, the TSPEC field may include a Required Packet Loss field regarding the packet loss probability.

According to an embodiment, the first information may further include information related to a criterion for performing the low-latency communication and information related to the maximum allowable time delay. Information related to the criteria for performing the low-latency communication may be set based on the information related to the maximum allowable time delay. According to one embodiment, information related to the maximum allowable time delay and information related to the criteria for performing the low-delay communication may also be included in the second information.

For example, when transmitting traffic to the transmitting STA, the receiving STA may drop a frame for transmitting the traffic when the maximum allowable time delay is reached. Therefore, the receiving STA may set a criterion for performing the low-latency communication. The receiving STA may perform the low-latency communication based on a specific ratio of the maximum allowable time delay value. For example, the receiving STA may set the specified ratio to 85%. The receiving STA may perform the low-latency communication only for frames exceeding 85% of the maximum allowable time delay value. The specified ratio may be included in at least one of the low-latency communication request frame or low-latency communication response frame.

In step S3020, the receiving STA may receive a low-latency communication response frame. The low-latency communication response frame may include second information for performing the low-latency communication. For example, the second information may include information related to the parameters for the low-latency communication. Therefore, the receiving STA may receive information related to the parameters for the low-latency communication determined from the transmitting STA.

According to an embodiment, the second information may include information related to a condition or period for transmitting information related to the time delay. The receiving STA may transmit information related to the time delay to the transmitting STA based on information related to a condition or period for transmitting information related to the time delay. In addition, the receiving STA may transmit information related to the time delay to the transmitting STA while performing the low latency communication. According to an embodiment, the receiving STA may also receive information related to the time delay from the transmitting STA.

The information related to the time delay may include information for reporting the time delay status. For example, the information related to the time delay may include at least one of information related to the current time delay value, information related to the number of frames exceeding the maximum allowable time delay value, sequence information exceeding the maximum allowable time delay value, and/or information related jitter value.

According to an embodiment, a period for transmitting information related to the time delay may be set in various ways. According to an embodiment, conditions for transmitting information related to time delay may be set in various ways. For example, when the current time delay value exceeds a specific value, the receiving STA may transmit information related to the time delay. For another example, the receiving STA may transmit information related to time delay when a traffic requirement is changed.

In step S3030, the receiving STA may perform the low-latency communication with the transmitting STA based on the first information and the second information. For example, the receiving STA may select a modulation coding scheme (MCS) for minimizing the time delay based on the first information and the second information. The receiving STA may transmit the time delay-sensitive traffic (i.e., low-latency traffic) based on the selected MCS.

According to an embodiment, the receiving STA may use a parameter for the low-latency communication received from the transmitting STA. For example, the receiving STA may use the EDCA parameter received from the transmitting STA. The received EDCA parameter may be distinguished from an EDCA parameter for normal traffic. The receiving STA may adjust a priority in channel contention with another STA by using the received EDCA parameter.

According to an embodiment, the receiving STA may transmit all traffic to the transmitting STA. Thereafter, the receiving STA may transmit a low-latency communication termination request frame to the transmitting STA. The receiving STA may receive a low-latency communication termination response frame from the transmitting STA based on the low-latency communication termination request frame. Then, the receiving STA may terminate the low-latency communication based on the low-latency communication termination response frame.

Figure 31:
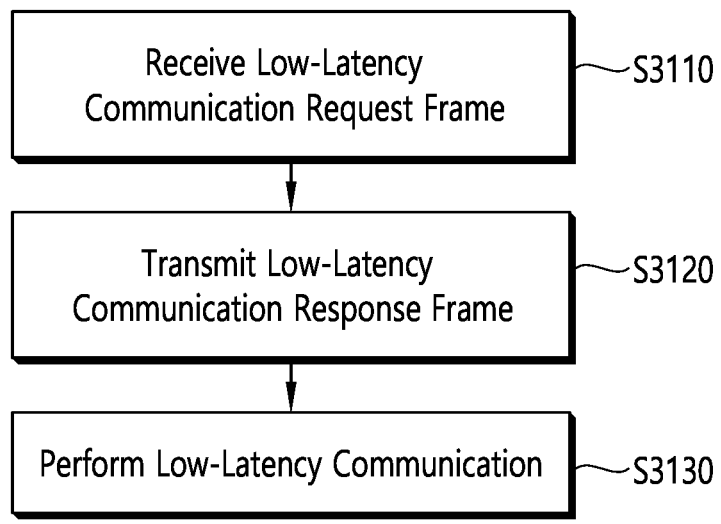
FIG. 31 is a flowchart for explaining an operation of a transmitting STA.

FIG. 31 is a flowchart for explaining an operation of a transmitting STA.

Referring to FIG. 31, in step S3110, the transmitting STA (e.g., AP 2401, 2501) may receive a low-latency communication request frame from the receiving STA (e.g., STA 2402, 2502). According to an embodiment, the low-latency communication request frame may include first information for performing the low-latency communication. The first information may include at least one of information for requesting a parameter for the low-latency communication and information related to traffic.

For example, the parameter for the low-latency communication may include information related to an EDCA (Enhanced Distributed Channel Access) parameter and/or information related to the UL OFDMA (Uplink orthogonal frequency division multiple access) resource allocation. As another example, the information related to the traffic may include information related to a jitter value or information related to an average packet size.

According to an embodiment, the low-latency communication request frame may include a TSPEC element field. The TSPEC element field may include the first information. For example, the TSPEC element field may include a Delay jitter field for information related to a jitter value. As another example, the TSPEC field may include a Required Packet Loss field regarding the packet loss probability.

According to an embodiment, the first information may further include information related to a criterion for performing the low-latency communication and information related to the maximum allowable time delay. Information related to the criteria for performing the low-latency communication may be set based on the information related to the maximum allowable time delay. According to one embodiment, information related to the maximum allowable time delay and information related to the criteria for performing the low-delay communication may also be included in the second information.

In step S3120, the transmitting STA may transmit a low-latency communication response frame. The low-latency communication response frame may include second information for performing low-latency communication. For example, the second information may include information related to the parameters for the low-latency communication. Therefore, the transmitting STA may transmit information related to the parameters for the low-latency communication determined from the receiving STA.

According to an embodiment, the transmitting STA may receive information for requesting a parameter for the low-latency communication from the receiving STA. The transmitting STA may determine a parameter for the low-latency communication based on the traffic and channel state of the receiving STA. The transmitting STA may transmit information related to the parameters for the determined low-latency communication to the receiving STA.

According to an embodiment, the second information may include information related to a condition or period for transmitting information related to the time delay. The transmitting STA may receive information related to the time delay from the receiving STA based on information related to a condition or period for transmitting information related to the time delay. In addition, the transmitting STA may receive information related to the time delay from the receiving STA while performing the low-latency communication. According to an embodiment, the transmitting STA may also transmit information related to the time delay to the receiving STA.

The information related to the time delay may include information for reporting the time delay status. For example, the information related to the time delay may include at least one of information related to the current time delay value, information related to the number of frames exceeding the maximum allowable time delay value, sequence information exceeding the maximum allowable time delay value, and/or information related jitter value.

According to an embodiment, a period for transmitting information related to the time delay may be set in various ways. According to an embodiment, conditions for transmitting information related to time delay may be set in various ways.

In step S3130, the transmitting STA may perform the low-latency communication with the receiving STA based on the first information and the second information. For example, the transmitting STA may select a modulation coding scheme (MCS) for minimizing the time delay based on the first information and the second information. The transmitting STA may perform the low-latency communication based on the selected MCS. For example, when traffic sensitive to time delay occurs in the transmitting STA, the transmitting STA may transmit the traffic to the receiving STA based on the selected MCS.

According to an embodiment, the transmitting STA may transmit a parameter for the low latency communication to the receiving STA. The transmitted EDCA parameter may be distinguished from the EDCA parameter for normal traffic. The receiving STA may adjust a priority in channel contention with another STA by using the received EDCA parameter.

According to an embodiment, the receiving STA may transmit all traffic to the transmitting STA. Thereafter, the transmitting STA may receive a low-latency communication termination request frame from the receiving STA. The transmitting STA may transmit a low-latency communication termination response frame to the receiving STA based on the low-latency communication termination request frame. Thereafter, the transmitting STA, based on the low-latency communication termination response frame, may terminate the low-latency communication.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or may be implemented based on the processor 610 and the memory 620 of FIG. 19. For example, the device may be configured to: receive a low-latency communication request frame, wherein the low-latency communication request frame includes first information for performing a low-latency communication, and the first information includes at least one of information for requesting a parameter for the low-latency communication and information related to a traffic; transmit a low-latency communication response frame, wherein the low-latency communication response frame includes second information for performing the low-latency communication, and the second information includes information related to the parameter for the low-latency communication; and based on the first information and the second information, perform the low-latency communication with a receiving STA.

The technical features of the present specification may be implemented based on a computer readable medium (CRM). For example, the CRM proposed by the present specification stores instructions that perform operations comprising: transmitting a low-latency communication request frame, wherein the low-latency communication request frame includes first information for performing a low-latency communication, and the first information includes at least one of information for requesting a parameter for the low-latency communication and information related to a traffic; receiving a low-latency communication response frame, wherein the low-latency communication response frame includes second information for performing the low-latency communication, and the second information includes information related to the parameter for the low-latency communication; and based on the first information and the second information, performing the low-latency communication with a transmitting STA. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a receiving station (STA) of a wireless local area network (WLAN) system, the method comprising:
transmitting a low-latency communication request frame, wherein the low-latency communication request frame includes first information for performing a low-latency communication, and the first information includes at least one of information for requesting a parameter for the low-latency communication and information related to a traffic;
receiving a low-latency communication response frame, wherein the low-latency communication response frame includes second information for performing the low-latency communication, and the second information includes information related to the parameter for the low-latency communication, wherein the parameter includes information related to an Enhanced Distributed Channel Access (EDCA) parameter or information related to an Uplink orthogonal frequency division multiple access (UL OFDMA) resource allocation, wherein the information related to the traffic includes information related to a jitter value or information related to an average packet size;
selecting a Modulation Coding Scheme (MCS) for minimizing a time delay based on the first information and the second information; and
based on the first information and the second information, performing the low-latency communication with a transmitting STA.

2. The method of claim 1, further comprising transmitting information related to a time delay during the low-latency communication.

3. The method of claim 1, further comprising:
transmitting a low-latency communication termination request frame to the transmitting STA;
based on the low-latency communication termination request frame, receiving a low-latency communication termination response frame from the transmitting STA; and
based on the low-latency communication termination response frame, terminating the low-latency communication.

4. The method of claim 1, wherein the low-latency communication request frame includes a Traffic Specification (TSPEC) element field, and wherein the TSPEC element field includes the first information.

5. The method of claim 1, wherein the first information further includes information related to a maximum allowable time delay and information related to a criterion for performing the low-latency communication, and
wherein the information related to the criterion for performing the low-latency communication is set based on information related to the maximum allowable time delay.

6. A receiving station (STA) in a wireless local area network (WLAN) system, the receiving STA comprising:
a transceiver configured to transmit and/or receive a wireless signal; and
a processor coupled to the transceiver,
wherein the processor is configured to:
transmit a low-latency communication request frame, wherein the low-latency communication request frame includes first information for performing a low-latency communication, and the first information includes at least one of information for requesting a parameter for the low-latency communication and information related to a traffic;
receive a low-latency communication response frame, wherein the low-latency communication response frame includes second information for performing the low-latency communication, and the second information includes information related to the parameter for the low-latency communication, wherein the parameter includes information related to an Enhanced Distributed Channel Access (EDCA) parameter or information related to an Uplink orthogonal frequency division multiple access (UL OFDMA) resource allocation, wherein the information related to the traffic includes information related to a jitter value or information related to an average packet size;
select a Modulation Coding Scheme (MCS) for minimizing a time delay based on the first information and the second information; and
based on the first information and the second information, perform the low-latency communication with a transmitting STA.

7. The receiving STA of claim 6, wherein the processor is further configured to transmit information related to a time delay during the low-latency communication.

8. The receiving STA of claim 6, wherein the processor is further configured to:
transmit a low-latency communication termination request frame to the transmitting STA;
based on the low-latency communication termination request frame, receive a low-latency communication termination response frame from the transmitting STA; and
based on the low-latency communication termination response frame, terminate the low-latency communication.

9. The receiving STA of claim 6, wherein the low-latency communication request frame includes a Traffic Specification (TSPEC) element field, and wherein the TSPEC element field includes the first information.

10. The receiving STA of claim 6,
wherein the first information further includes information related to a maximum allowable time delay and information related to a criterion for performing the low-latency communication, and
wherein the information related to the criterion for performing the low-latency communication is set based on information related to the maximum allowable time delay.

* * * * *